United States Patent
Chen

(10) Patent No.: US 11,361,549 B2
(45) Date of Patent: *Jun. 14, 2022

(54) SCENE FRAME MATCHING FOR AUTOMATIC CONTENT RECOGNITION

(71) Applicant: Roku, Inc., San Jose, CA (US)

(72) Inventor: Juikun Chen, West Jordan, UT (US)

(73) Assignee: Roku, Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/142,619

(22) Filed: Jan. 6, 2021

(65) Prior Publication Data

US 2021/0133460 A1 May 6, 2021

Related U.S. Application Data

(63) Continuation of application No. 16/390,410, filed on Apr. 22, 2019, now Pat. No. 10,963,699, which is a
(Continued)

(51) Int. Cl.
*G06K 9/00* (2022.01)
*G06V 20/40* (2022.01)
(Continued)

(52) U.S. Cl.
CPC ............ *G06V 20/46* (2022.01); *G06V 10/758* (2022.01); *G06V 20/41* (2022.01);
(Continued)

(58) Field of Classification Search
CPC .......... G06K 9/00744; G06K 9/00718; G06K 9/6212; G06K 9/00758; H04N 21/23418;
(Continued)

(56) References Cited

U.S. PATENT DOCUMENTS 5,805,733 A    9/1998  Wang et al.
7,034,849 B1 *  4/2006  Weybrew ............ G06F 9/30032
                                                          345/592
(Continued)

FOREIGN PATENT DOCUMENTS

CN           104036293 A      9/2014

*Primary Examiner* — Solomon G Bezuayehu
(74) *Attorney, Agent, or Firm* — McDonnell Boehnen Hulbert & Berghoff LLP

(57) ABSTRACT

A method for scene frame matching for automatic content recognition. The method includes receiving fingerprints indicative of frames of a media stream. The method also includes obtaining scene centroids of corresponding scenes of the media stream. Each scene includes fingerprints ranging from an initial frame having a corresponding initial fingerprint and a last frame having a corresponding last fingerprint. Each scene centroid represents a mean of fingerprints corresponding to a respective scene. The mean of fingerprints is determined by an average of pixel values corresponding to the fingerprints of the respective scene. For each scene centroid, the method includes determining a distance between the respective scene centroid and a target fingerprint of a corresponding target frame of the media stream and determining a target scene of the target frame as being the respective scene of the scene centroid having a shortest distance to the target fingerprint of the target frame.

20 Claims, 10 Drawing Sheets

Related U.S. Application Data continuation of application No. 15/726,987, filed on Oct. 6, 2017, now Pat. No. 10,922,551.

(51) Int. Cl.
*H04N 21/466* (2011.01)
*H04N 21/234* (2011.01)
*H04N 21/25* (2011.01)
*H04N 21/44* (2011.01)
*H04N 21/84* (2011.01)
*H04N 21/845* (2011.01)
*G06V 10/75* (2022.01)

(52) U.S. Cl.
CPC ..... *H04N 21/23418* (2013.01); *H04N 21/251* (2013.01); *H04N 21/44008* (2013.01); *H04N 21/4668* (2013.01); *H04N 21/84* (2013.01); *H04N 21/8456* (2013.01)

(58) Field of Classification Search
CPC ........... H04N 21/251; H04N 21/44008; H04N 21/4668; H04N 21/84; H04N 21/8456
See application file for complete search history.

(56) References Cited

U.S. PATENT DOCUMENTS

| | | | |
|---|---|---|---|
| 7,466,842 B2 | 12/2008 | Tuzel et al. | |
| 8,345,769 B1 | 1/2013 | Diard | |
| 8,358,381 B1 | 1/2013 | Diard | |
| 8,374,386 B2* | 2/2013 | Bayram | G06V 10/40 707/736 |
| 8,494,234 B1* | 7/2013 | Bozinovic | G06V 10/255 382/103 |
| 9,129,148 B1* | 9/2015 | Li | G06F 16/1734 |
| 9,652,677 B2* | 5/2017 | Umezaki | G06V 20/58 |
| 10,089,514 B1* | 10/2018 | Shen | G06F 3/0446 |
| 2005/0024391 A1* | 2/2005 | Damera-Venkata | G06T 3/4053 345/698 |
| 2005/0041156 A1 | 2/2005 | Kondo et al. | |
| 2005/0147167 A1 | 7/2005 | Dumitras et al. | |
| 2008/0247663 A1* | 10/2008 | Jacobsen | G06F 16/7854 382/266 |
| 2008/0259218 A1 | 10/2008 | Kondo et al. | |
| 2009/0154806 A1* | 6/2009 | Chang | G06V 20/48 382/173 |
| 2009/0201380 A1* | 8/2009 | Peaslee | H04N 5/144 348/208.4 |
| 2009/0245685 A1* | 10/2009 | Makii | H04N 5/23248 382/276 |
| 2009/0262218 A1* | 10/2009 | Makii | G06T 11/00 348/239 |
| 2009/0268097 A1* | 10/2009 | Lin | H04N 19/87 348/700 |
| 2009/0328237 A1* | 12/2009 | Rodriguez | H04N 21/8358 726/32 |
| 2010/0020880 A1 | 1/2010 | Susnow et al. | |
| 2011/0069939 A1 | 3/2011 | Choi et al. | |
| 2011/0122255 A1* | 5/2011 | Haritaoglu | H04N 5/913 348/180 |
| 2011/0129017 A1* | 6/2011 | Oami | G06F 16/786 375/E7.076 |
| 2011/0222787 A1* | 9/2011 | Thiemert | G06F 16/785 382/225 |
| 2013/0064417 A1* | 3/2013 | Fernandes | G06V 20/47 382/100 |
| 2013/0101014 A1 | 4/2013 | Fu et al. | |
| 2013/0148883 A1 | 6/2013 | Lee | |
| 2013/0259323 A1 | 10/2013 | Deng | |
| 2013/0263166 A1 | 10/2013 | Fleischman | |
| 2014/0043543 A1 | 2/2014 | Konuma et al. | |
| 2014/0168468 A1* | 6/2014 | Levoy | H04N 5/2353 348/229.1 |
| 2014/0245463 A1 | 8/2014 | Suryanarayanan et al. | |
| 2014/0340570 A1* | 11/2014 | Meyers | H04N 5/211 348/370 |
| 2014/0368420 A1* | 12/2014 | Nishio | G09G 3/3406 345/102 |
| 2015/0049122 A1 | 2/2015 | Buckley et al. | |
| 2015/0086067 A1 | 3/2015 | Mehta et al. | |
| 2015/0092066 A1* | 4/2015 | Geiss | H04N 5/235 348/180 |
| 2015/0170312 A1* | 6/2015 | Mehta | G06T 1/0085 382/154 |
| 2016/0227275 A1* | 8/2016 | Vuori | H04N 21/8549 |
| 2016/0286285 A1* | 9/2016 | Geyzel | H04N 19/00 |
| 2016/0376652 A1 | 12/2016 | Sarwal | |
| 2017/0017844 A1 | 1/2017 | Jeong et al. | |
| 2017/0032033 A1 | 2/2017 | Neumeier et al. | |
| 2017/0364605 A1 | 12/2017 | Sobel et al. | |
| 2017/0365075 A1 | 12/2017 | Meganck et al. | |
| 2017/0372142 A1* | 12/2017 | Bilobrov | G06V 10/48 |
| 2018/0005038 A1* | 1/2018 | Granstrom | G06K 9/00711 |
| 2018/0014012 A1* | 1/2018 | Yu | H04N 19/159 |
| 2018/0137367 A1* | 5/2018 | Pavetic | G06F 16/7867 |
| 2018/0300554 A1* | 10/2018 | Kansara | H04N 21/8549 |
| 2018/0365372 A1* | 12/2018 | Araya | G16B 40/20 |
| 2019/0108401 A1* | 4/2019 | Chen | G06V 10/758 |

* cited by examiner

SCENE FRAME MATCHING FOR AUTOMATIC CONTENT RECOGNITION

CROSS REFERENCE TO RELATED APPLICATIONS

This U.S. patent application is a continuation of, and claims priority to, U.S. patent application Ser. No. 16/390,410, filed on Apr. 22, 2019, which is a continuation of, and claims priority to, U.S. patent application Ser. No. 15/726,987, filed on Oct. 6, 2017, which are herein incorporated by reference as if fully set forth in this description.

TECHNICAL FIELD

This disclosure relates to matching a scene frame during automatic content recognition.

BACKGROUND

Media devices today are becoming more and more common and may range from fixtures in a home, such as a television, to mobile devices traveling along with a media consumer. Media devices, such as televisions, set-top-boxes, mobile phones, laptops, and tablets, may access and may retrieve media content from a variety of sources. For example, a media device may receive media content via satellite, over-the-air broadcasting, or streaming systems from a wired or a wireless connection. As the use of media devices continues to increase, media device connectivity to media content has also increased. With this growth, new media content markets have emerged and old media content market have adapted to understand and to provide contextually-relevant media content to the media consumer.

SUMMARY

One aspect of the disclosure provides a method of scene frame matching for automatic content recognition. The method includes receiving, at data processing hardware, fingerprints indicative of frames of a media stream. The method also includes obtaining, at the data processing hardware, scene centroids of corresponding scenes of the media stream. Each scene includes fingerprints ranging from an initial frame having a corresponding initial fingerprint and a last frame having a corresponding last fingerprint. Each scene centroid represents a mean of fingerprints corresponding to a respective scene. The mean of fingerprints is determined by an average of pixel values corresponding to the fingerprints of the respective scene. For each scene centroid, the method includes determining, by the data processing hardware, a distance between the respective scene centroid and a target fingerprint of a corresponding target frame of the media stream. The method further includes determining, by the data processing hardware, a target scene of the target frame as being the respective scene of the scene centroid having a shortest distance to the target fingerprint of the target frame.

Implementations of the disclosure may include one or more of the following optional features. In some implementations, for each sequentially adjacent pair of frames, obtaining the scene centroids includes determining, by the data processing hardware, a Pearson correlation coefficient between the respective fingerprints. The method may also include determining, by the data processing hardware, whether the Pearson correlation coefficient satisfies a correlation threshold. When the Pearson correlation coefficient satisfies the correlation threshold, the method may identify, by the data processing hardware, a first scene as ending at a first frame of the pair of frames and a second scene as starting at a second frame of the pair of frames. For each identified scene, the method may further determine, by the data processing hardware, the respective scene centroid as the mean of fingerprints corresponding to the respective scene.

In some examples, for each frame of the target scene, the method includes determining, by the data processing hardware, a Pearson correlation coefficient between the respective fingerprint of the respective frame of the scene and the target fingerprint. The method may further include determining, by the data processing hardware, whether the Pearson correlation coefficient satisfies a correlation threshold. When the Pearson correlation coefficient satisfies the correlation threshold, the method may identify, by the data processing hardware, the respective frame of the scene as being the target frame. Additionally or alternatively, each fingerprint may represent a 16 integer vector corresponding to average pixel values of sixteen sub-frames, the sixteen sub-frames defining a four by four array of the corresponding frame.

Another aspect of the disclosure provides a method for scene frame matching for automatic content recognition. The method includes receiving, at data processing hardware, media device fingerprints indicative of media device frames of a media device stream at a corresponding media device. The method also includes identifying, by the data processing hardware, a target media device frame of the media device stream. The target media device frame has a corresponding target media device fingerprint. The method further includes obtaining, at the data processing hardware, scene centroids of corresponding scenes of the media device stream. Each scene includes an initial media device frame having a corresponding initial media device fingerprint and a last media device frame having a corresponding last media device fingerprint. Each scene centroid represents a mean of fingerprints corresponding to the respective scene. For each scene centroid, the method includes determining, by the data processing hardware, a distance between the respective scene centroid and the target media device fingerprint. The method also includes determining, by the data processing hardware, a target scene of the target media device frame as being the respective scene of the scene centroid having a shortest distance to the most-recent media device fingerprint.

Implementations of the disclosure may include one or more of the following optional features. In some configurations, the target frame is a most-recent media device frame of the media device stream. Additionally or alternatively, the method may include receiving, at the data processing hardware, broadcast fingerprints indicative of broadcast frames of the scene from a broadcast media stream. For each broadcast frame of the scene, the method may determine, by the data processing hardware, a Pearson correlation coefficient between the respective broadcast fingerprint and the target media device fingerprint. The method may further determine, by the data processing hardware, whether the Pearson correlation coefficient satisfies a correlation threshold. When the Pearson correlation coefficient satisfies the correlation threshold, the method may identify, by the data processing hardware, the respective broadcast frame as matching the target media device frame.

In some examples, obtaining the scene centroids includes receiving, at the data processing hardware, broadcast fingerprints indicative of broadcast frames of a broadcast media stream. The broadcast media stream may include the scenes. For each sequentially adjacent pair of broadcast frames, when obtaining the scene centroids, the method may also include determining, by the data processing hardware, a Pearson correlation coefficient between the respective broadcast fingerprints. Optionally, the method may further include determining, by the data processing hardware, whether the Pearson correlation coefficient satisfies a correlation threshold. When the Pearson correlation coefficient satisfies the correlation threshold, the method may identify, by the data processing hardware, a first scene as ending at a first broadcast frame of the pair of broadcast frames and a second scene as starting at a second broadcast frame of the pair of broadcast frames. For each identified scene, the method may also include determining, by the data processing hardware, the respective scene centroid as the mean of fingerprints corresponding to the respective scene.

In some implementations, the scene centroid represents a time centroid representing a range from an initial time of the initial media device fingerprint to a last time of the last media device fingerprint. Additionally or alternatively, each fingerprint may represent a 16 integer vector corresponding to average pixel values of sixteen sub-frames, the sixteen sub-frames defining a four by four array of the corresponding frame.

Yet another aspect of the disclosure provides a method for scene frame matching for automatic content recognition. The method includes receiving, at data processing hardware, broadcast fingerprints indicative of broadcast frames of a broadcast media stream. The broadcast media stream includes scenes. For each sequentially adjacent pair of broadcast frames, the method includes determining, by the data processing hardware, a Pearson correlation coefficient between the respective broadcast fingerprints. The method also includes determining, by the data processing hardware, whether the Pearson correlation coefficient satisfies a correlation threshold. When the Pearson correlation coefficient satisfies the correlation threshold, the method includes identifying, by the data processing hardware, a first scene as ending at a first broadcast frame of the pair of broadcast frames and a second scene as starting at a second broadcast frame of the pair of broadcast frames. For each identified scene, the method includes determining, by the data processing hardware, a respective scene centroid as the mean of fingerprints corresponding to a respective scene. The mean of fingerprints is determined by an average of pixel values corresponding to the fingerprints of the respective scene.

Implementations of the disclosure may include one or more of the following optional features. In some implementations, the method includes receiving, at the data processing hardware, a target fingerprint of a target frame. For each scene centroid, the method may determine, by the data processing hardware, a distance between the respective scene centroid and the target fingerprint. The method may further determine, by the data processing hardware, a target scene of the target frame as being the respective scene of the scene centroid having a shortest distance to the target fingerprint of the target frame. In this implementation, for each broadcast frame of the target scene, the method may include determining, by the data processing hardware, a Pearson correlation coefficient between the respective broadcast fingerprint and the target fingerprint. Additionally or alternatively, the method may determine, by the data processing hardware, whether the Pearson correlation coefficient satisfies a correlation threshold. When the Pearson correlation coefficient satisfies the correlation threshold, the method may also identify, by the data processing hardware, the respective broadcast frame as being the target frame.

In some examples, the scene centroid represents a time centroid representing a range from an initial time of the initial broadcast fingerprint to a last time of the last broadcast fingerprint. Optionally, each fingerprint may represent a 16 integer vector corresponding to average pixel values of sixteen sub-frames, the sixteen sub-frames defining a four by four array of the corresponding frame.

Another aspect of the disclosure provides a system for scene frame matching for automatic content recognition. The system includes data processing hardware and memory hardware in communication with the data processing hardware. The memory hardware stores instructions that when executed on the data processing hardware cause the data processing hardware to perform operations. The operations include receiving fingerprints indicative of frames of a media stream. The operations also include obtaining scene centroids of corresponding scenes of the media stream. Each scene includes an initial frame having a corresponding initial fingerprint and a last frame having a corresponding last fingerprint. Each scene centroid represents a mean of fingerprints of a respective scene. The mean of fingerprints is determined by an average of pixel values corresponding to the fingerprints of the respective scene. For each scene centroid, the operations determine a distance between the respective scene centroid and a target fingerprint of a corresponding target frame of the media stream. The operations further include determining a target scene of the target frame as being the respective scene of the scene centroid having a shortest distance to the target fingerprint of the target frame.

Implementations of the disclosure may include one or more of the following optional features. In some examples, when obtaining the scene centroids for each sequentially adjacent pair of frames, the system includes determining a Pearson correlation coefficient between the respective fingerprints or determining whether the Pearson correlation coefficient satisfies a correlation threshold. When the Pearson correlation coefficient satisfies the correlation threshold, the system may identify a first scene as ending at a first frame of the pair of frames and a second scene as starting at a second frame of the pair of frames. For each identified scene, the system may also include determining the respective scene centroid as the mean of fingerprints of the respective scene.

In some configurations, for each frame of the target scene, the system includes determining a Pearson correlation coefficient between the respective fingerprint of the respective frame of the scene and the target fingerprint or determining whether the Pearson correlation coefficient satisfies a correlation threshold. When the Pearson correlation coefficient satisfies the correlation threshold, the system may identify the respective frame of the scene as being the target frame. Optionally, each fingerprint of the system may represent a 16 integer vector corresponding to average pixel values of sixteen sub-frames, the sixteen sub-frames defining a four by four array of the corresponding frame.

Yet another aspect of the disclosure provides a system for scene frame matching for automatic content recognition. The system includes data processing hardware and memory hardware in communication with the data processing hardware. The memory hardware stores instructions that when executed on the data processing hardware cause the data processing hardware to perform operations. The operations include receiving media device fingerprints indicative of media device frames of a media device stream at a corresponding media device. The operations also include identifying a target media device frame of the media device stream, the target media device frame having a corresponding target media device fingerprint. The operations further include obtaining scene centroids of corresponding scenes of the media device stream. Each scene includes an initial media device frame having a corresponding initial media device fingerprint and a last media device frame having a corresponding last media device fingerprint. Each scene centroid represents a mean of fingerprints corresponding to a respective scene. The mean of fingerprints is determined by an average of pixel values corresponding to the fingerprints of the respective scene. For each scene centroid, the operation includes determining a distance between the respective scene centroid and the target media device fingerprint. The operations also include determining a target scene of the target media device frame as being the respective scene of the scene centroid having a shortest distance to the most-recent media device fingerprint.

Implementations of the disclosure may include one or more of the following optional features. In some implementations, the target frame is a most-recent media device frame of the media device stream. The operations may further include receiving broadcast fingerprints indicative of broadcast frames of the scene from a broadcast media stream. For each broadcast frame of the scene, the operation may determine a Pearson correlation coefficient between the respective broadcast fingerprint and the target media device fingerprint. The operations may also determine whether the Pearson correlation coefficient satisfies a correlation threshold. When the Pearson correlation coefficient satisfies the correlation threshold, the operations may identify the respective broadcast frame as matching the target media device frame.

In some configurations, obtaining the scene centroids includes receiving broadcast fingerprints indicative of broadcast frames of a broadcast media stream; the broadcast media stream may include the scenes. For each sequentially adjacent pair of broadcast frames, the operations may include determining a Pearson correlation coefficient between the respective broadcast fingerprints. Additionally or alternatively, for each sequentially adjacent pair of broadcast frames, the operations may include determining whether the Pearson correlation coefficient satisfies a correlation threshold. When the Pearson correlation coefficient satisfies the correlation threshold, the operations may identify a first scene as ending at a first broadcast frame of the pair of broadcast frames and a second scene as starting at a second broadcast frame of the pair of broadcast frames. For each identified scene, the operations may determine the respective scene centroid as the mean of fingerprints corresponding to the scene.

In some examples, the scene centroid represents a time centroid representing a range from an initial time of the initial media device fingerprint to a last time of the last media device fingerprint. Optionally, each fingerprint may represent a 16 integer vector corresponding to average pixel values of sixteen sub-frames, the sixteen sub-frames defining a four by four array of the corresponding frame.

Another aspect of the disclosure provides a system for scene frame matching for automatic content recognition. The system includes data processing hardware and memory hardware in communication with the data processing hardware. The memory hardware stores instructions that when executed on the data processing hardware cause the data processing hardware to perform operations. The operations include receiving broadcast fingerprints indicative of broadcast frames of a broadcast media stream, the broadcast media stream includes scenes. For each sequentially adjacent pair of broadcast frames, the operations include determining a Pearson correlation coefficient between the respective broadcast fingerprints and determining whether the Pearson correlation coefficient satisfies a correlation threshold. When the Pearson correlation coefficient satisfies the correlation threshold, the operations include identifying a first scene as ending at a first broadcast frame of the pair of broadcast frames and a second scene as starting at a second broadcast frame of the pair of broadcast frames. For each identified scene, the operations include determining a respective scene centroid as a mean of fingerprints corresponding to a respective scene. The mean of fingerprints is determined by an average of pixel values corresponding to the fingerprints of the respective scene.

Implementations of the disclosure may include one or more of the following optional features. In some configurations, the operations further include receiving a target fingerprint of a target frame. For each scene centroid, the operations may determine a distance between the respective scene centroid and the target fingerprint. The operations may further include determining a target scene of the target frame as being the respective scene of the scene centroid having a shortest distance to the target fingerprint of the target frame.

In some examples, for each broadcast frame of the target scene, the operations further include determining a Pearson correlation coefficient between the respective broadcast fingerprint and the target fingerprint. Optionally, for each broadcast frame of the target scene, the operations may determine whether the Pearson correlation coefficient satisfies a correlation threshold. When the Pearson correlation coefficient satisfies the correlation threshold, the operations may identify the respective broadcast frame as being the target frame.

In some implementations, the scene centroid represents a time centroid representing a range from an initial time of the initial broadcast fingerprint to a last time of the last broadcast fingerprint. Additionally or alternatively, each fingerprint may represent a 16 integer vector corresponding to average pixel values of sixteen sub-frames, the sixteen sub-frames defining a four by four array of the corresponding frame.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Generally, automatic content recognition (ACR) is the process of automatically identifying media content on a media device or within a media file. ACR has become increasingly useful to identify vast amounts of media content consumed by society every day. From a commercial perspective, ACR may allow businesses and other entities to understand media content consumption and, perhaps more effectively, to market or to target consumers (i.e. media device users) of the media content. For example, an advertisement or an offer is likely more effective when the advertisement is personalized to the user of a media device. Accordingly, broadcasters, commercial providers, advertisers and other entities want to know what programs are being viewed or, more particularly, where the user is in the program during viewing. With this type of information, the media device user may receive more precisely catered media content.

Frame matching processes, such as a scene frame matcher, may provide broadcasters and additional content providers with knowledge of a channel Ch and a position of a user within a media device stream. Yet a potential problem with frame match processes in ACR systems is that, in some situations, the frame matching by the ACR system may have even greater matching error (i.e. risk of falsely identifying a frame match) when there is a difference in frame rates between a broadcast frame rate and the media device frame rate. For example, if the media device frame rate is much lower than the broadcast frame rate, a timing mismatch may occur such that the ACR system falsely identifies the position of the user within the media device stream. In other words, the ACR system may identify the position either a number of frames ahead or behind the current viewing position of the user. In some examples, the timing mismatch is large enough that additional content providers performing dynamic advertising replacement (DAR) based on the ACR system replace live programming instead of advertisements. The scene frame matcher may prevent these shortcomings by accurately matching a sampled frame.

Figure 1A:
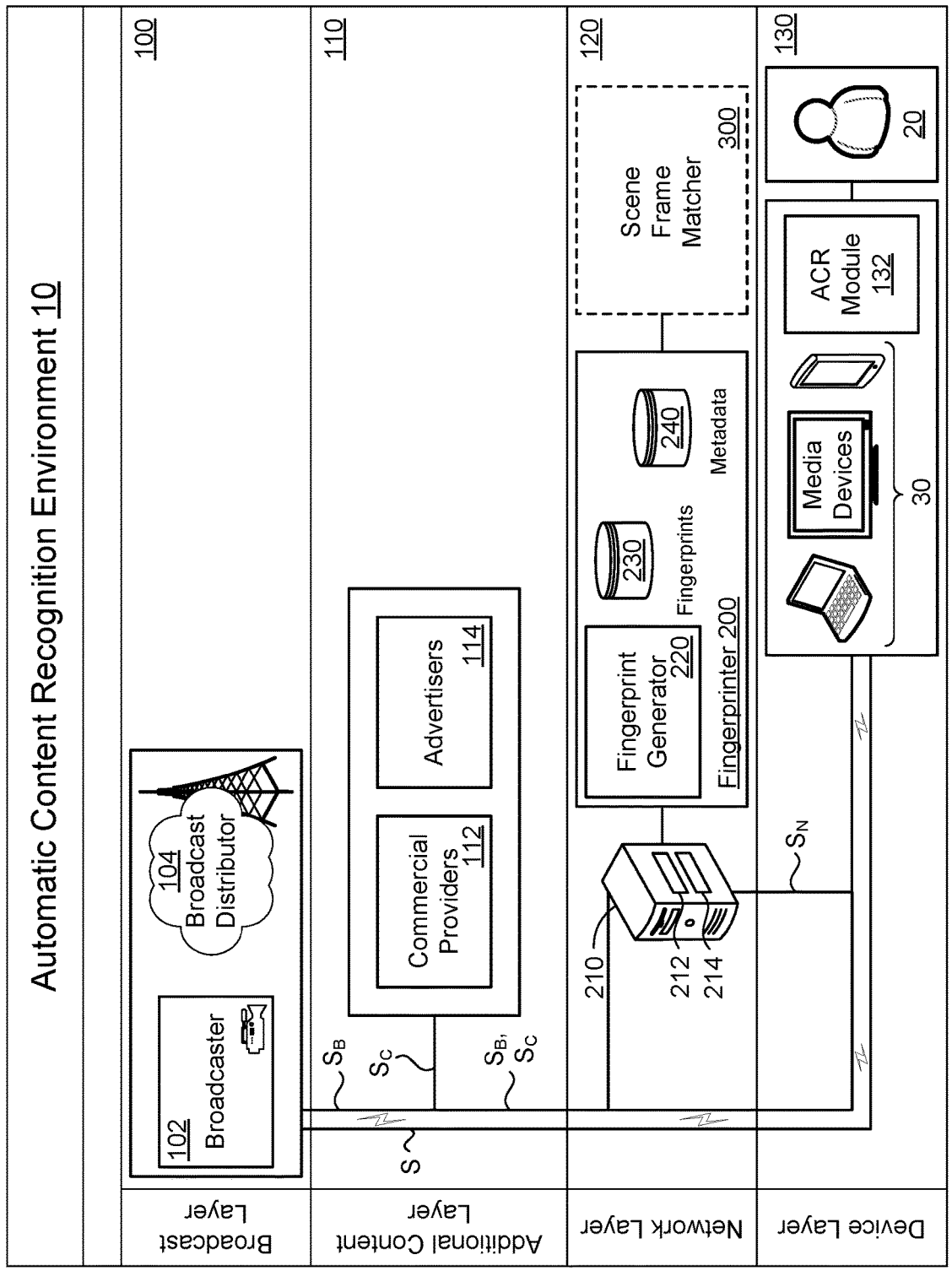
FIG. 1A is a schematic view of an example of an automatic content recognition environment.

FIG. 1A is an example of an automatic content recognition environment 10. The ACR environment 10 may include several layers to distribute media content to a user 20 (i.e., a viewer) of a media device 30. FIG. 1A attempts to simplify the media content distribution process into four layers: a broadcast layer 100; an additional content layer 110; a network layer 120; and a device layer 130. Each layer 100, 110, 120, 130 may have entities that influence a media stream S. The broadcast layer 100 represents broadcast entities that may be involved to produce a broadcast media stream $S_B$. These broadcast entities may include a broadcaster 102 and a broadcast distributor 104. The broadcaster 102 may be one or more media content providers such as local broadcasters, multi-channel networks, or other media content owners. The broadcast distributor 104 is a broadcast entity that provides infrastructure or resources (e.g., signal wires, communication towers, communication antennas, servers, etc.) to distribute media content. The broadcaster 102 and the broadcast distributor 104 may be the same broadcast entity or a different broadcast entity depending on broadcasting variables, such as a type of media content being provided or a type of media device receiving the media content.

In some implementations, the media stream S includes an additional media content stream $S_C$ from content entities represented as the additional content layer 110. These content entities include commercial providers 112, advertisers 114, or other entities contributing to the additional media content stream $S_C$ of the media stream S. Generally, commercial providers 112 are content entities that procure and/or host additional media content, while advertisers 114 are content entities that generate the additional media content stream $S_C$ with content, such as advertisements, offers, deals, discounts, benefits, or other promotions of goods and/or services. Additionally or alternatively, the commercial providers 112 and the advertisers 114 may be the same content entity. The additional content layer 110 may communicate the additional media content stream $S_C$ to the broadcast layer 100, the network layer 120, the device layer 130, or any combination thereof. Optionally, the additional content layer 110 may pair the additional media content stream $S_C$ with the broadcast media stream $S_B$ to form a media stream S that includes the additional media content stream $S_C$.

Referring further to FIG. 1A, the network layer 120 is configured to receive the broadcast media stream $S_B$ and the additional media content stream $S_C$ from the broadcast layer 100 and/or the additional content layer 110. For example, if the network layer 120 receives the media stream S from the broadcast layer 100, the network layer 120 may receive the broadcast media stream $S_B$ with the additional media content stream $S_C$ or independent of the additional media content stream $S_C$. Similarly, if the network layer 120 receives the media stream S from the additional content layer 110, the network layer 120 may receive the broadcast media stream $S_B$ with the additional media content stream $S_C$ or independent of the additional media content stream $S_C$. In some implementations, the network layer 120 may pair the broadcast media stream $S_B$ from the broadcast layer 100 with the additional media content stream $S_C$ from the additional content layer 110 to generate a network media stream $S_N$ representing the broadcast media stream $S_B$ impregnated with the additional media content stream $S_C$.

The network layer 120 includes a fingerprinter 200. The fingerprinter 200 is configured to operate on a server 210 having data processing hardware 212 and memory hardware 214. The fingerprinter 200 includes a fingerprint generator 220. The network layer 120 may be configured to store fingerprints 222 and metadata 224 related to the fingerprints 222 in a fingerprint database 230 and/or a metadata database 240. Generally, a fingerprint 222 is at least one identifier corresponding to at least one frame $F_n$ of the media stream S. For example, the at least one identifier may be a value (e.g., pixel value), an alphanumeric representation, or a compressed version of the audio visual image. Additionally or alternatively, the network layer 120 is configured to store the broadcast media stream $S_B$, the additional media content stream $S_C$, or both. Optionally, the network layer 120 occurs in whole or in part in other layers of the ACR environment 100 to reduce costs and/or to increase processing efficiency of the ACR environment 100. For example, the network layer 120 may occur within the broadcaster layer 100 and/or the additional content layer 110. As an illustration, the broadcaster 102 may be directly paired with a fingerprinter 200 to prevent transmissions errors or other communication complications.

The network layer 120 further includes a scene frame matcher 300. FIG. 1A depicts the scene frame matcher 300 with a dotted box to represent that the scene frame matcher 300 may actually exist in whole or in part on other layers besides the network layer 120 (i.e. the broadcast layer 100, the additional content layer 110, or the device layer 130). The scene frame matcher 300 is configured to receive fingerprints 222 and to determine whether centroids $C_{PT}$ of the fingerprints 222 correspond to a target fingerprint 222, $222_T$ (e.g., sampled at the media device 30). In some examples, the scene frame matcher 300 receives broadcast fingerprints 222, 222b and indicates when the broadcast fingerprints 222, 222b correspond to the target fingerprint 222, $222_T$ from any combination of the broadcast media stream $S_B$, the additional content stream $S_C$, or the network media stream $S_N$. Optionally, content entities from other layers, such as the broadcaster 102, the broadcast distributor 104, commercial providers 112, or advertisers 114, may provide the scene frame matcher 300 with ad frames $F_{ad}$ and/or ad fingerprints 222, 222a while the scene frame matcher 300 determines whether the ad fingerprints 222, 222a correspond to the target fingerprint 222, $222_T$ from any combination of the broadcast media stream $S_B$, the additional content stream $S_C$, or the network media stream $S_N$. Based on the determination of the target fingerprint 222, $222_T$, the scene frame matcher 300 may communicate a target frame $F_T$ related to the target fingerprint 222, $222_T$ to one or more content entities, ACR modules 132, and/or media devices 30 within the ACR environment 10.

FIG. 1A also illustrates that any layer (i.e., the broadcast layer 100, the additional content layer 110, or the network layer 120) may communicate with the device layer 130. At the device layer 130, media devices 30, such as televisions, PCs, laptops, tablets, or mobile phones, receive a media stream S (e.g., any combination of the broadcast media stream $S_B$, the additional content stream $S_C$, or the network media stream $S_N$) and may convey all or a portion of the corresponding media stream S (e.g., any combination of the broadcast media stream $S_B$, the additional content stream $S_C$, or the network media stream $S_N$) to a user 20. A device may mean any hardware or any software related to a media device 30 configured to receive or to communicate some form of media content. In some implementations, the media devices 30 may be configured to interpret or to interact with the corresponding media stream S (e.g., any combination of the broadcast media stream $S_B$, the additional content stream $S_C$, or the network media stream $S_N$). For example, the media devices 30 identify the additional media content stream $S_C$ from the broadcast media stream $S_B$. The media devices 30 may replace or overlay the additional media content stream $S_C$ of the broadcast media stream $S_B$ with replacement media content. The media devices 30 may filter the broadcast media stream $S_B$, $S_C$ for predefined content. Additionally or alternatively, the media devices 30 may be configured to communicate information or data related to the media stream (e.g., any combination of the broadcast media stream $S_B$, the additional content stream $S_C$, or the network media stream $S_N$) with the broadcast layer 100, the additional content layer 110, the network layer 120, or other media devices 30 of the device layer 130.

Figure 1B:
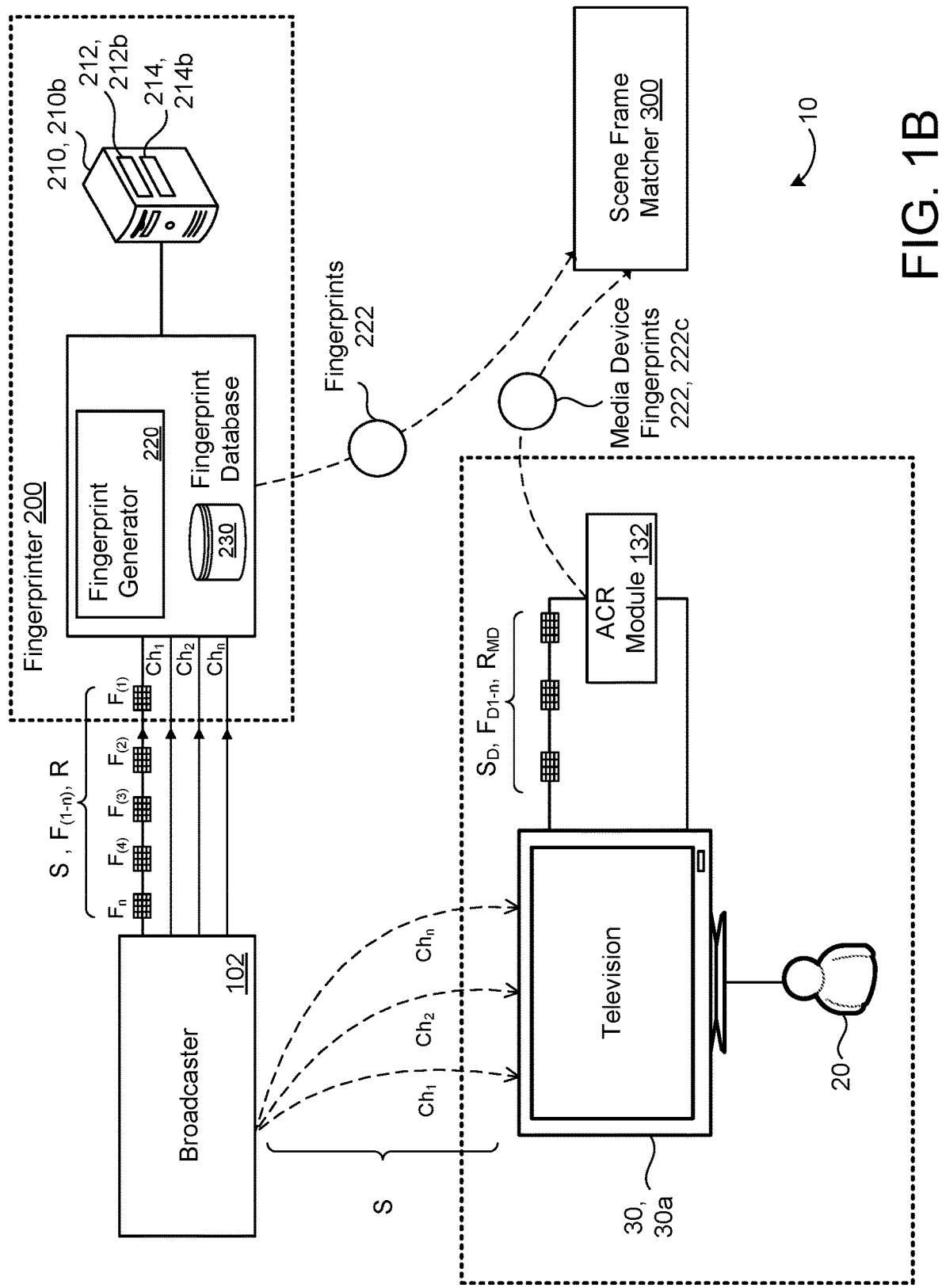
FIG. 1B is a schematic view of an example of an automatic content recognition environment.

FIG. 1B is an example of an ACR environment 10. The ACR environment 10 includes a broadcaster 102, a fingerprinter 200, the media device 30, the ACR module 132, and the scene frame matcher 300. The broadcaster 102 broadcasts the media stream S by channels $Ch_{1-n}$ to the fingerprinter 200 at a frame rate R. The frame rate R divides the media stream S into frames $F_{1-n}$ such that each frame $F_{1-n}$ corresponds to an audio visual image represented by pixels within the media stream S. The fingerprinter 200 is configured to receive each frame $F_{1-n}$ at the fingerprint generator 220. The fingerprint generator 220 receives each frame $F_{1-n}$ and is configured to generate fingerprints 222 indicative of each frame $F_{1-n}$. Generally, a fingerprint 222 is at least one identifier corresponding to at least one frame $F_{1-n}$. The fingerprinter 200 may store each fingerprint 222 in a database, such as the fingerprint database 230. In some examples, the fingerprinter 200 stores each fingerprint 222 according to or along with metadata 224 corresponding to the frame $F_{1-n}$ such as a frame location (e.g., a frame time code), a type of frame (e.g., live program or advertisement), or a fingerprint identifier tag. In other examples, the fingerprinter 200 has a separate database or databases corresponding to the metadata 224 of each fingerprints 222. A separate database for metadata 224 may allow the fingerprinter 200 to store more fingerprints 222.

Referring further to FIG. 1B, the broadcaster 102 also broadcasts the media stream S to the media device 30. The media device 30 is configured to capture media frames $F_{D1-n}$ from the media device stream $S_D$ and to communicate the captured media frames $F_{D1-n}$ to the scene frame matcher 300. In the example shown in FIG. 1B, the media device 30 is a television 30, 30a (TV) that receives the media stream S. For example, the television 30, 30a receives television channels $Ch_{1-n}$ as the media stream S.

In some implementations, the broadcaster 102 provides the media stream S at the broadcast frame rate R. The media device 30 (e.g., depicted as the TV 30, 30a) may receive the media stream S at the corresponding frame rate R as the media stream S. Often, the frame rate R corresponds to various industry standards of a broadcast format (e.g., 1080 60i, 720 60P, etc.). For example, some common frame rates R include 30P (29.97 frames per second), 24P, (23.98 frames per second), and 60P (59.94 frames per second). The media device 30 may be configured to capture frames $F_{D1-n}$ of the media stream S at a media device frame rate $R_{MD}$. The media device frame rate $R_{MD}$ is the frame rate that a corresponding media device 30 provides captured frames $F_{D1-n}$ to the ACR module 132. In some implementations, the media device 30 may be configured to receive the media stream S at the frame rate R, but yet be configured to capture frames $F_{D1-n}$ of the media stream S at a media device frame rate $R_{MD}$ for the ACR module 132. For example, the frame rate R is different than the media device frame rate $R_{MD}$. An example of this difference is that the frame rate R is greater than the media device frame rate $R_{MD}$ (e.g., a frame rate of 30P and a media device frame rate $R_{MD}$ of 4 frames per second). The difference in frame rates may be resource limitations (CPU, memory, etc.) relating to frame capturing hardware or software at the media device 30. Moreover, a lower media device frame rate $R_{MD}$ compared to the broadcast frame rate R may cause a low frame capture rate at the media device 30. A low frame capture rate may cause difficulties within the ACR environment 10 because less media device frames $F_{D(1-n)}$ from the media device 30 may compromise or reduce automatic content recognition accuracy of the ACR module 132. An advantage of the scene frame matcher 300 is that the scene frame matcher 300 may identify a single target frame $F_T$, such as a single captured media device frame $F_D$. Therefore, the scene frame matcher 300 enables accuracy of the ACR environment 10 even in low capture rate scenarios.

In some examples, the scene frame matcher 300 receives broadcast fingerprints 222, 222b from the fingerprinter 200 and at least one media device frame $F_D$ from the media stream S. The scene frame matcher 300 may compare the at least one media device frame $F_D$ to the broadcast frames $F_{B(1-n)}$ to identify the at least one media device frame and/or information regarding the at least one media device frame $F_D$. In some implementations, the scene frame matcher 300 is also part of the network layer 130. In other implementations, the scene frame matcher 300 may be a part of the ACR module 132 and as such may be an internal device to the television 30, 30a (e.g., hardware or software of the television 30, 30a) or an external device in communication with the television 30, 30a (e.g., a headend system or a set top box).

Figure 2:
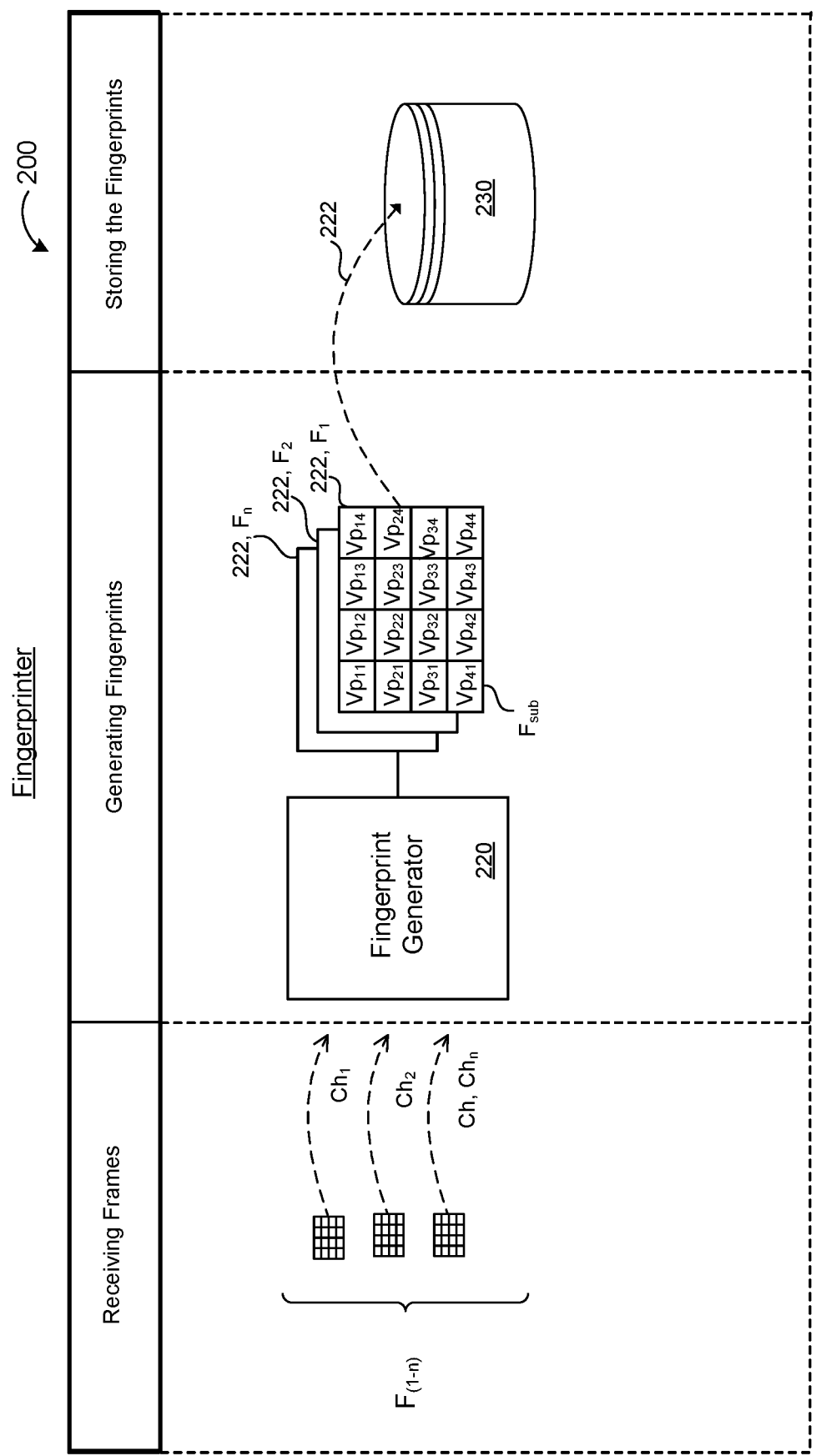
FIG. 2 is a schematic view of an example fingerprinter of the automatic content recognition environment.

FIG. 2 is an example of the fingerprint generator 220 of the fingerprinter 200. The fingerprint generator 220 receives the frames $F_{1-n}$ corresponding to channels $Ch_{1-n}$ of the media stream S. The fingerprint generator 220 may generate a fingerprint 222 (e.g., an ad fingerprint 222, 222a, a broadcast fingerprint 222, 222b, or a media device fingerprint 222, 222c) for each received frame $F_{1-n}$ (e.g., an ad frame $F_{ad}$, a broadcast frame $F_B$, or a media device frame $F_D$) and may store the fingerprint 222 in the fingerprint database 230. In some examples, each fingerprint 222 represents at least one pixel value $V_P$ of the frame $F_{1-n}$ of the corresponding media stream S. The at least one pixel value $V_P$ may be an average pixel value or a sum of color space values of the broadcast frame $F_{1-n}$. For example, the at least one pixel value $V_P$ may represent a sum and/or average of grayscale values of a corresponding frame $F_{1-n}$ when the fingerprint generator 220 generates a fingerprint 222, 222 according to a gray-UV (YUV) color space. In other words, each pixel of the corresponding frame $F_{1-n}$ is represented by a grayscale value such that the fingerprint 222 represents the sum and/or average of the grayscale values of a pixel area. In some implementations, the fingerprint 222 is a identifier based on sub-frames $F_{sub}$ of the corresponding frame $F_{1-n}$. Depending on the pixels per sub-frame $F_{sub}$, each sub-frame $F_{sub}$ may have a corresponding pixel value $V_p$ or a corresponding average pixel value.

FIG. 2 also illustrates an example of a fingerprint 222, $F_{1-n}$ corresponding to a frame $F_{1-n}$ divided into sub-frames $F_{sub}$. In some examples, the fingerprint generator 220 may divide each frame $F_{1-n}$ into sub-frames $F_{sub}$ to more accurately compare or to distinguish between frames $F_{1-n}$. With sub-frames $F_{sub}$, each fingerprint 222 may represent more than one average pixel value $V_p$ of the corresponding frame $F_{1-n}$. By dividing each frame $F_{1-n}$ into sub-frames $F_{sub}$, more details (e.g., pixels of each sub-frame $F_{sub}$) are taken into account during fingerprint generation than fingerprints 222 based on a pixel value $V_P$ (or average pixel value) of an entire frame $F_{1-n}$. As such, the number of sub-frames $F_{sub}$ that the fingerprint generator 220 divides each frame $F_{1-n}$ into depends on a desired level of accuracy. For example, as shown in FIG. 2, the fingerprint generator 220 divides each frame $F_{1-n}$ into sixteen sub-frames $F_{sub}$ defining a four by four array. Each sub-frame $F_{sub}$ of the sixteen sub-frames $F_{sub}$ has an average pixel value $V_{p11-44}$ such that each fingerprint 222 represents each corresponding frame $F_{1-n}$ by a sixteen value integer vector having an integer value associated with each sub-frame $F_{sub}$. Although the figures may depict each frame $F_{1-n}$ or each media device frame $F_{D1-n}$ as a four by four array, any sub-frame division is possible.

FIGS. 3A-3E are examples of the scene frame matcher 300. The scene frame matcher 300 includes a scene identifier 310, a scene analyzer 320, a distance identifier 330, and a target identifier 340. The scene identifier 310 is configured to determine from the media stream S when a scene 302 changes to another scene 302 (i.e. a scene change 312). Generally, a scene 302 is a series of sequential frames $F_{1-n}$ with a similar pixel value $V_p$. The scene 302 has similar pixel values $V_p$ because each frame F typically corresponds to a fraction of a second based on a frame rate R. As a fraction of a second, subject matter captured as an audio visual image represented by each frame F is unable to change quickly unless the scene 302 changes. Therefore, the at least one pixel value $V_p$ represented by a fingerprint 222 may determine a scene change 312 by a dissimilarity in the pixel value $V_P$ between fingerprints 222 corresponding to two sequentially adjacent (i.e. neighboring) frames $F_{adj}$, $F_{1-n}$. For each scene identified by the scene identifier 310, the scene analyzer 320 is configured to determine a scene centroid 322. With each scene centroid 322, the distance identifier 330 is configured to determine a distance $D_T$ between each respective scene centroid 322 and a target fingerprint 222, $222_T$ of a corresponding target frame $F_T$ of the media stream S. The target identifier 340 is configured to determine a target scene 302, $302_T$ of the target frame $F_T$ based on a shortest distance $D_{T(min)}$ of each distance $D_T$ determined by the distance identifier 330.

Throughout FIGS. 3A-3E a dotted box generally indicates a selection of an element or elements to illustrate functionality of the scene frame matcher 300. For example, in some illustrations, the dotted box indicates the selection of element(s) as an input or an output of the scene frame matcher 300. In other illustrations, the dotted box indicates a logic decision of hardware and/or software related to the scene frame matcher 300.

Figure 3A:
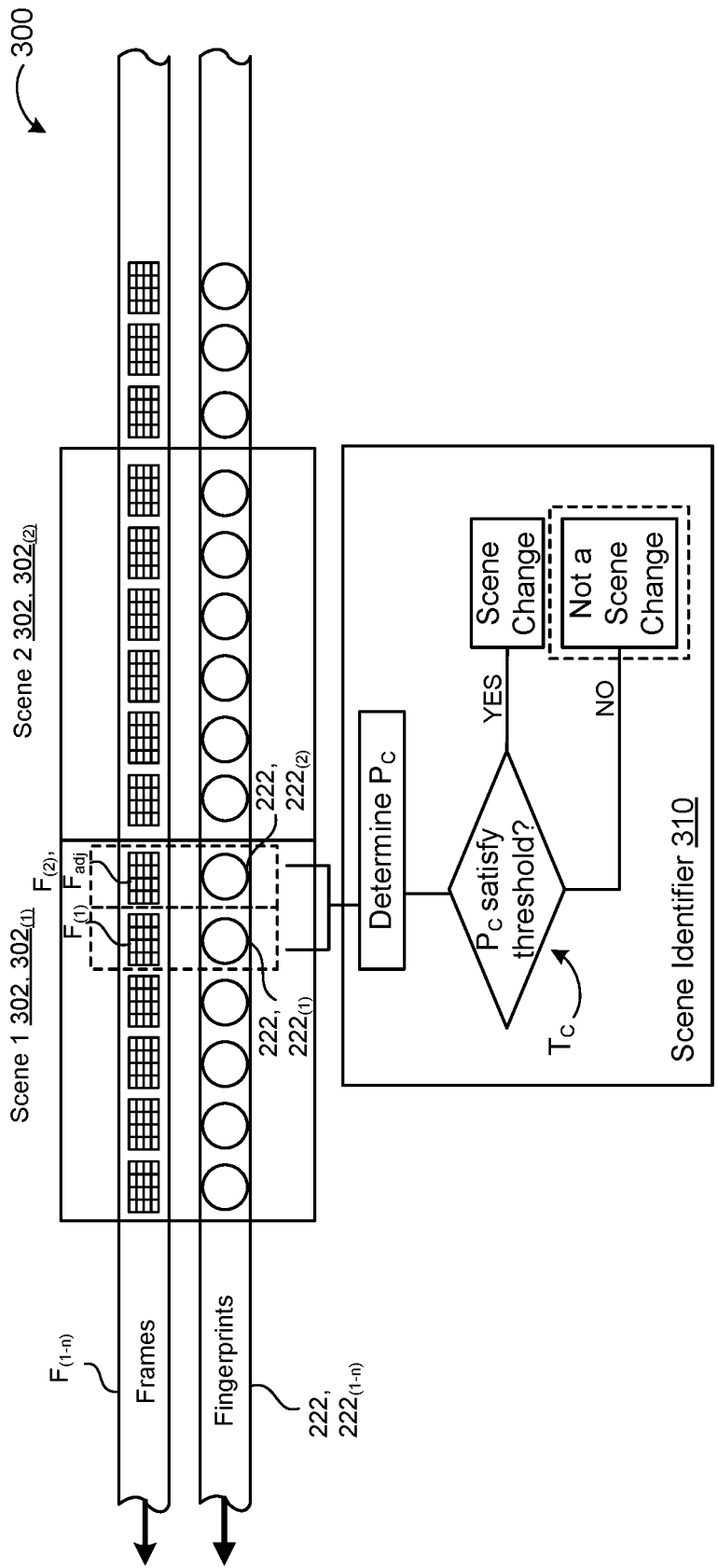
FIGS. 3A and 3B are schematic views of example portions of a scene frame matcher corresponding to scene identifier.
Figure 3B:
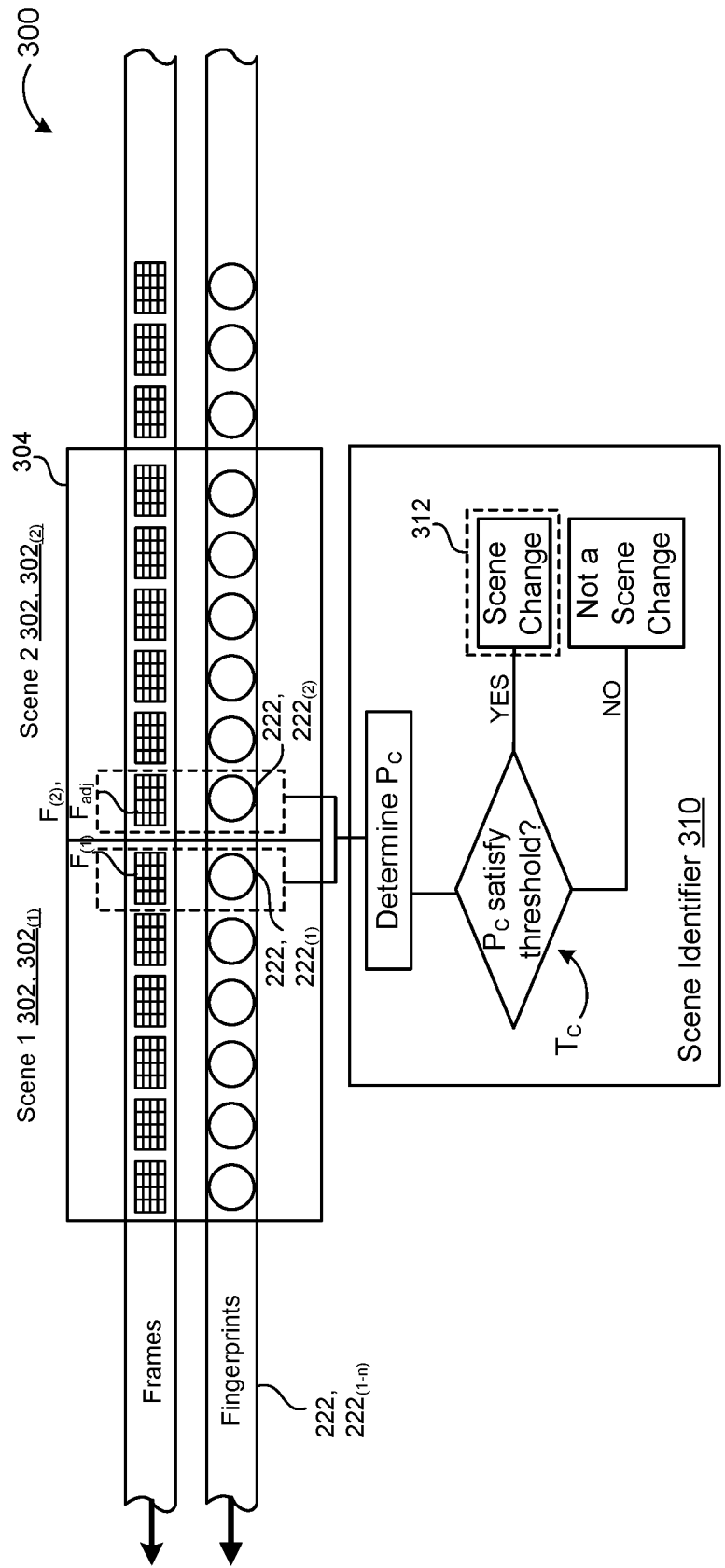

FIGS. 3A and 3B are examples of the scene identifier 310 portion of the scene frame matcher 300. The scene identifier 310 receives fingerprints 222 indicative of frames $F_{(1-n)}$ of the media stream S. A sequence of frames $F_{(1-n)}$ with similar pixel values $V_p$ define a scene 302 such that the media stream S includes a series of scenes 302, $302_{(1-n)}$. The scene identifier 310 determines a scene change 312 between a first scene 302, $302_{(1)}$ and a second scene 302, $302_{(2)}$ based on a scene-change correlation. The scene-change correlation is a measurement of similarity indicating a similarity between frames F and/or fingerprints 222 corresponding to frames F. The measurement of similarity may be a quantitative correlation such as a statistical correlation that measures associations between two variables (e.g., a Pearson correlation, a Kendall correlation, or a Spearman correlation). FIGS. 3A and 3B depict basic examples where the scene-change correlation is a Pearson correlation coefficient $P_C$. In some examples, the scene identifier 310 determines whether the Pearson correlation coefficient $P_C$ satisfies a correlation threshold $T_C$. When the Pearson correlation coefficient $P_C$ satisfies the correlation threshold $T_C$, the scene identifier 310 may determine the scene change 312 has or has not occurred, depending on how the scene identifier 310 is configured. As some examples, FIGS. 3A and 3B illustrate the scene identifier 310 configured to identify that the scene change 312 has occurred when the Pearson correlation coefficient $P_C$ satisfies the correlation threshold $T_C$.

In some implementations, the scene change correlation has different similarity levels where each similarity level indicates a different degree of similarity between frames F and/or fingerprints 222 corresponding to frames F. For example, instead of the correlation threshold $T_C$, the scene change correlation has two similarity levels, a high similarity and a low similarity. In this example, the high and low similarity correspond to discrete quantitative measurement ranges (e.g., low=0-0.50 and high=0.051-1.0). These discrete quantitative measurement ranges may be pre-programmed for the scene identifier 310 or adjusted based on the scene-change correlation measured at the scene identifier 310. As an example, the Pearson correlation coefficient $P_C$ between fingerprints 222 may be a high measurement (e.g., towards 1.0) or a low measurement (e.g., towards 0). When the Pearson correlation coefficient $P_C$ is high, a first fingerprint 222, $222_{(1)}$ and a second fingerprint 222, $222_{(2)}$ have a similarity that indicates a scene change 312 has not occurred. Conversely, when the Pearson correlation coefficient $P_C$ is low, the first fingerprint 222, $222_{(1)}$ and the second fingerprint 222, $222_{(2)}$ have a dissimilarity that indicates a scene change 312 has occurred.

Referring to FIGS. 3A and 3B, the scene identifier 310 identifies the scene change 312 by determining the Pearson correlation coefficient $P_C$ between each sequentially adjacent (i.e. neighboring) pair of frames $F_{(1-a)}$, $F_{adj}$ within the media stream S. In these examples, the scene identifier 310 determines the Pearson correlation coefficient $P_C$ between a first fingerprint 222, $222_{(1)}$ of a first frame $F_{(1)}$ of the pair of frames $F_{(1-n)}$, $F_{adj}$ and a second fingerprint 222, $222_{(2)}$ of a second frame $F_{(2)}$ of the pair of frames $F_{(1-n)}$, $F_{adj}$. FIG. 3A depicts the scene identifier 310 determining that no scene change 312 has occurred between the first fingerprint 222, $222_{(1)}$ of the first frame $F_{(1)}$ of the pair of frames $F_{(1-n)}$, $F_{adj}$ and the second fingerprint 222, $222_{(2)}$ of the second frame $F_{(2)}$ of the pair of frames $F_{(1-n)}$, $F_{adj}$. FIG. 3B illustrates that the scene identifier 310 is configured to iteratively determine the scene change correlation between sequentially adjacent pair of frames $F_{(1-n)}$, $F_{adj}$ subsequent to the sequentially adjacent pair of frames $F_{(1-n)}$, $F_{adj}$ of FIG. 3A (e.g., FIG. 3A is a first iteration of the scene identifier 310 and FIG. 3B is a second iteration of the scene identifier 310). As shown in FIG. 3B, in some implementations when the scene identifier 310 determines that the Pearson correlation coefficient $P_C$ between the sequentially adjacent pair of frames $F_{(1-n)}$, $F_{adj}$ corresponds to the scene change 312, the scene identifier 310 identifies a first scene 302, $302_{(1)}$ and a second scene 302, $302b_{2)}$. In other words, the scene identifier 310 identifies the second scene 302, $302_{(2)}$ as the subsequent scene 304 of the first scene 302, $302_{(1)}$. For example, the scene identifier 310 identifies the first scene 302, $302_{(1)}$ as ending at the first frame $F_{(1)}$ of the pair of frames $F_{(1-n)}$, $F_{adj}$ and the second scene 302, $302_{(2)}$ as starting at the second frame $F_{(2)}$ of the pair of frames $F_{(1-n)}$, $F_{adj}$. In this example, the first frame $F_{(1)}$ corresponds to the first fingerprint 222, $222_{(1)}$ of the pair of frames $F_{(1-n)}$, $F_{adj}$ and the second frame $F_{(2)}$ corresponds to the second fingerprint 222, $222_{(2)}$ of the pair of frames $F_{(1-n)}$, $F_{adj}$. Additionally or alternatively, the scene identifier 310 identifies the first fingerprint 222, $222_{(1)}$ of the pair of frames $F_{(1-n)}$, $F_{adj}$ as a last fingerprint 222, $222_{(L)}$ of a last frame $F_{(L)}$ of the first scene 302, $302_{(1)}$ and the second fingerprint 222, $222_{(2)}$ of the pair of frames $F_{(1-n)}$, $F_{adj}$ as an initial fingerprint 222, $222_{(i)}$ of an initial frame $F_{(i)}$ of the second scene 302, $302_{(2)}$.

Referring further to the scene identifier 310, the scene identifier 310 may receive any type of fingerprints 222 indicative of any type of frames $F_{(1-n)}$ within the media stream S. In some examples, the scene identifier 310 receives broadcast fingerprint 222, $222b$ indicative of broadcast frames $F_{B(1-n)}$ of the broadcast media stream $S_B$. In these examples for each sequentially adjacent pair of broadcast frames $F_{B(1-n)}$, $F_{Badj}$, the scene identifier 310 determines the scene change correlation between a first broadcast fingerprint 222, $222b_{(1)}$ of a first broadcast frame $F_{B(1)}$ of the pair of broadcast frames $F_{B(1-n)}$, $F_{Badj}$ and a second broadcast fingerprint 222, $222b_{(2)}$ of a second broadcast frame $F_{B(2)}$ of the pair of broadcast frames $F_{B(1-n)}$, $F_{Badj}$. Similarly mentioned above, when the scene change correlation satisfies the correlation threshold $T_C$, the scene identifier 310 identifies a first broadcast scene 302, $302b_{(1)}$ as ending at the first broadcast frame $F_{B(1)}$ of the pair of broadcast frames $F_{B(1-n)}$, $F_{Badj}$ and a second broadcast scene 302, $302b_{(2)}$ as starting at the second broadcast frame $F_{B(2)}$ of the pair of broadcast frames $F_{B(1-n)}$, $F_{Badj}$. In a similar manner, the scene identifier 310 may identify media device scenes 302, $302c_{(1-n)}$ based on each sequentially adjacent pair of media device frames $F_{D(1-n)}$, $F_{Dadj}$ of the media stream S or a media device stream $S_D$ at the media device 30 and correlation criteria (e.g., thresholds or similarity levels).

Figure 3C:
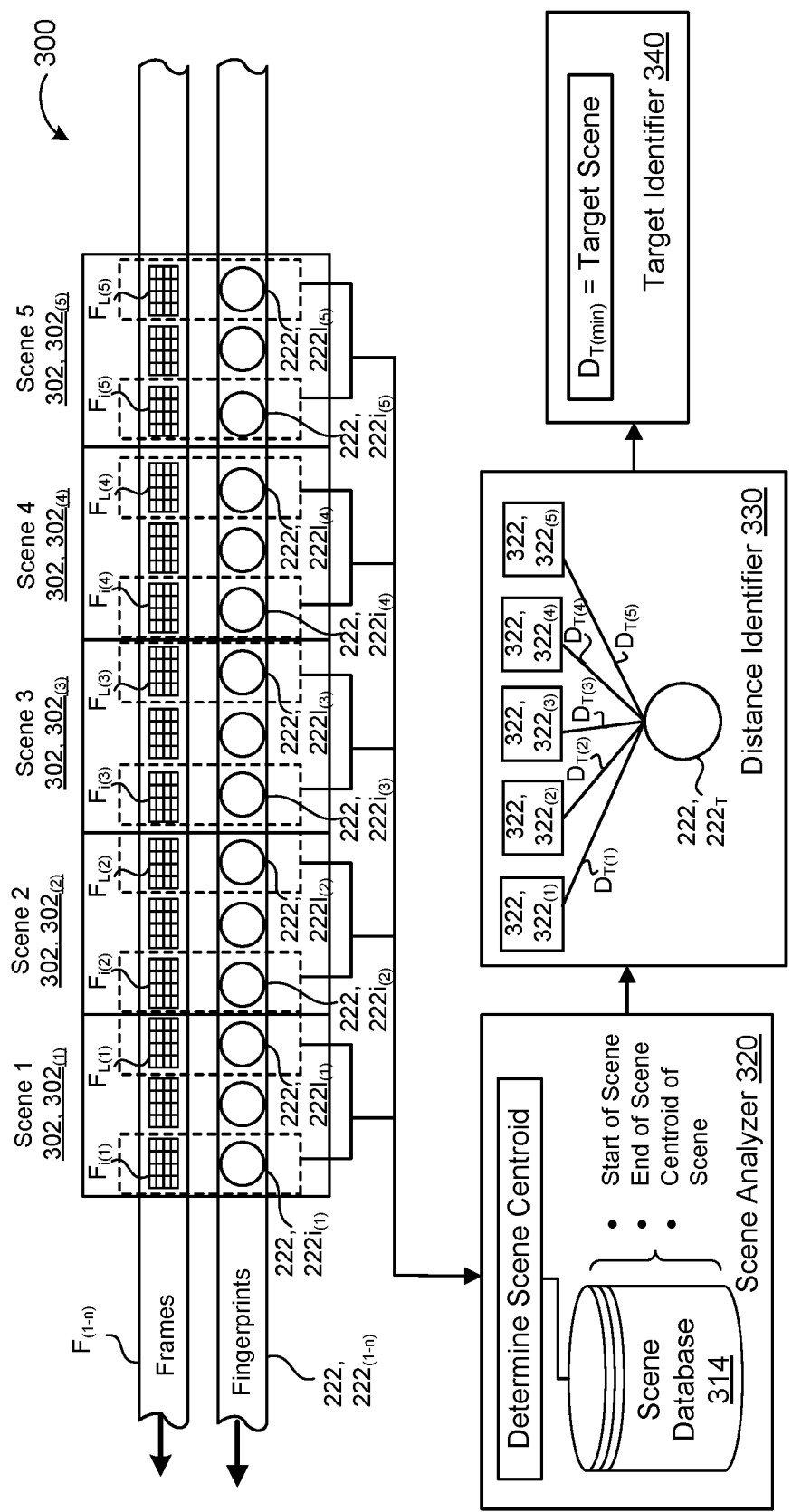
FIGS. 3C-3F are schematic views of example portions of scene frame matcher.
Figure 3D:
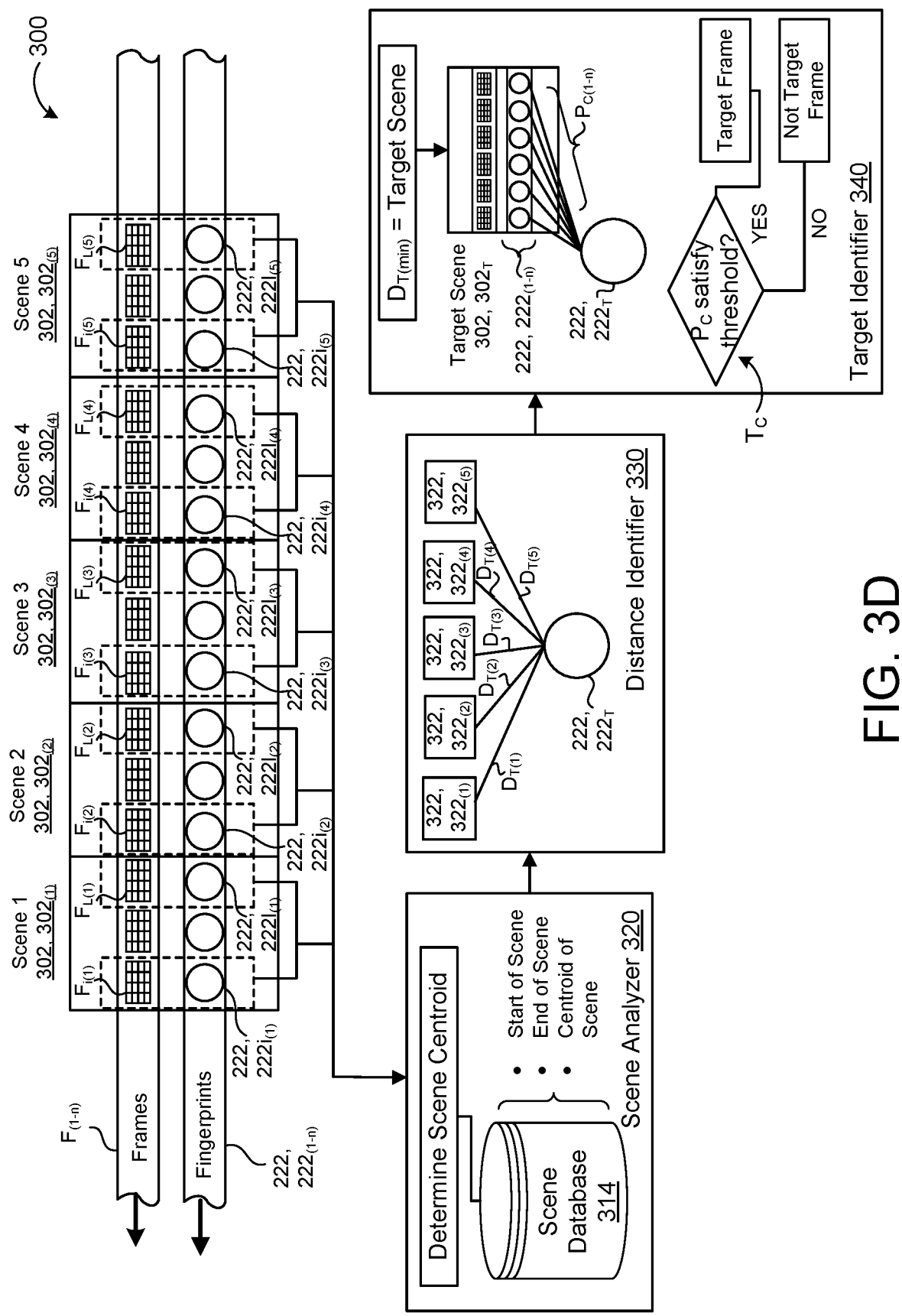
Figure 3E:
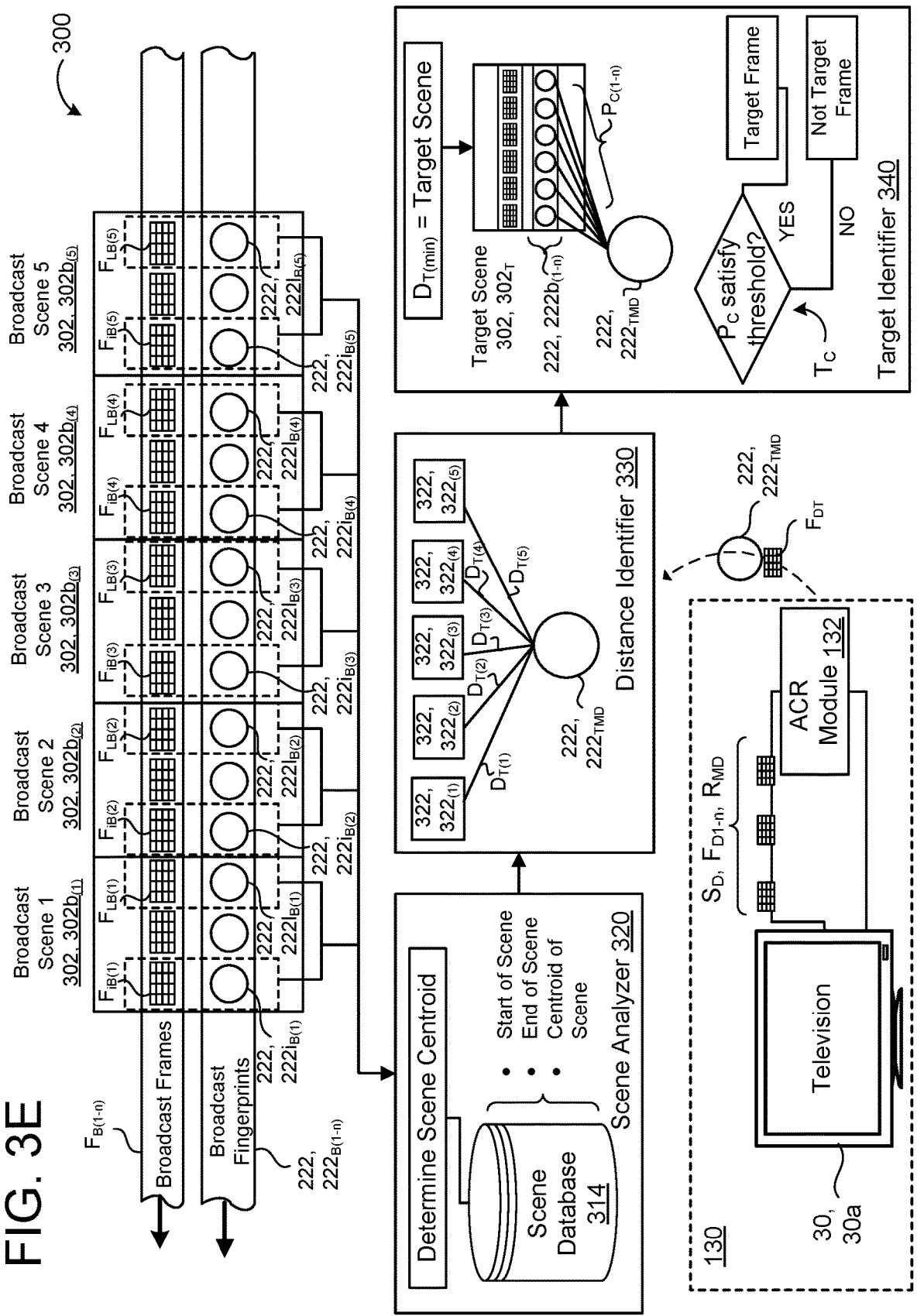

FIGS. 3C-3E are examples of a portion of the scene frame matcher 300. The portion includes the scene analyzer 320, the distance identifier 330, and the target identifier 340. In these examples, the scene identifier 310 has previously determined a set of scenes 302, $302_{(1-5)}$ within the media stream S. In some examples, the scene analyzer 320 is configured to obtain or to determine scene centroids 322, $322_{(1-n)}$ of corresponding scenes 302, $302_{(1-n)}$ of the media stream S. The corresponding scenes 302, $302_{(1-n)}$ may be at least one of advertisement scenes 302, $302a_{(1-n)}$, broadcast scenes 302, $302b_{(1-n)}$, or media device scenes 302, $302c_{(1-n)}$. Each identified scene 302, $302_{(1-n)}$ from the distance identifier 330 includes a plurality of fingerprints 222 that correspond to frames within the scene 302, $302_{(1-n)}$. Generally, the frames within each identified scene 302, $302_{(1-n)}$ span from an initial frame $F_i$ having a corresponding initial fingerprint 222, $222i$ to a last frame $F_L$ having a corresponding last fingerprint 222, $222l$ as shown in FIGS. 3C-3E. Each scene centroid 322 is a representation based on fingerprints 222 associated with a scene 302. In other words, each scene centroid 322 may be an expression of fingerprints 222 ranging from the initial fingerprint 222, $222i$ of the corresponding initial frame $F_i$ to the last fingerprint 222, $222l$ of the corresponding last frame $F_L$. In some implementations, each scene centroid 322 corresponds to a mean of the fingerprints 222 associated with a scene 302. For example, when the fingerprints 222, 222 correspond to pixel values $V_P$, the scene centroid 322 is determined by an average of pixel values $V_P$ corresponding to the fingerprints 222 of the respective scene 302. To further elaborate on the example, the average of pixel values $V_P$ corresponding to the fingerprints 222 of the respective scene 302 is a sum of each pixel value $V_P$ of each fingerprint 222 of a scene 302 divided by the number of frames and/or fingerprints 222 included in the scene 302. Although mathematically, a centroid often corresponds to an arithmetic mean (e.g., an average as described above), other calculation methods related to centroids or, more generally, taking into account fingerprints 222 particular to a scene 302, may enable the scene frame matcher 300 to perform functions described herein with varying accuracy. As one such example, instead of a scene centroid 322, each identified scene 302, $302_{(1-n)}$ from the distance identifier 330 includes a scene midpoint represented by a midpoint $M_{pt}$ between the initial fingerprint 222, $222i$ of the corresponding initial frame $F_i$ to the last fingerprint 222, $222l$ of the corresponding last frame $F_L$. In this example, although a scene midpoint 324 accounts for fingerprints 222 and/or frames particular to a scene 302, a scene midpoint 324 may not be as accurate as a scene centroid 322 because the scene centroid 322 takes into account more than two fingerprints 222 of scene 302.

Additionally or alternatively, the scene centroid 322 represents a time centroid $C_t$ for a scene 302. For example, the scene centroid 322 represents a time centroid ranging from an initial time $t_i$ of the initial fingerprint 222, $222i$ to a last time $t_l$ of the last fingerprint 222, $222l$. Each time of the time centroid range (e.g., the initial time $t_i$ and the last time $t_l$) may correspond to metadata, such as a frame location or a frame time code.

In some implementations, the scene analyzer 320 includes a scene database 314. In these implementations, when the scene analyzer 320 determines or obtains scene centroids 322, $322_{(1-n)}$ of corresponding scenes 302, $302_{(1-n)}$, the scene analyzer 320 stores the scene centroids 322, $322_{(1-n)}$ within the scene database 314. The scene database 314 is configured to store information regarding each scene 302 identified by the scene identifier 310. For example, the scene database 314 stores information (e.g., corresponding frame location, a frame time, or other related frame metadata) regarding a start of each scene 302, an end of each scene 302, or the centroid $C_{pt}$ of each scene 302. The scene database 314 may be a table or other query-based database format such that the scene frame matcher 300 may access and utilize centroids $C_{pt}$. The scene database 314 may be dynamic such that the scene database 314 may add or delete parts (e.g., scenes 302, $302_{(1-n)}$ and corresponding scene information) of the database. The scene database 314 may be part of the scene analyzer 320 or a remote storage database in communication with the scene analyzer 320.

Referring further to FIGS. 3C-3E, the distance identifier 330 is configured to receive scene centroids 322, $322_{(1-n)}$ and a target fingerprint 222, $222_T$ of a corresponding target frame $F_T$ of the media stream S. The distance identifier 330 may retrieve the scene centroids 322, $322_{(1-n)}$ or the scene analyzer 320 may communicate the scene centroids 322, $322_{(1-n)}$ to the distance identifier 330. For each scene centroid 322, the distance identifier 330 is further configured to determine a distance $D_T$ between the respective scene centroid 322 and the target fingerprint 222, $222_T$. In some examples, the distance identifier 330 determines the distance $D_T$ between the respective scene centroid 322 and the target fingerprint 222, $222_T$ according to Euclidean distance. In some implementations, the distance identifier 330 receives a target fingerprint 222, $222_T$ corresponding to more than one target frame $F_T$. In other words, the distance identifier 330 may receive a plurality of media device fingerprints 222, 222c indicative of media device frames $F_{D(1-n)}$ of the media stream S at the media device 30. As an example, an ACR module 132 captures media device frames $F_{D(1-n)}$ of the media stream S at the media device 30 such that the captured media device frames $F_{D(1-n)}$ are communicated to the screen frame matcher 300 as media device fingerprints 222, 222c. In some implementations, the plurality of media device fingerprints 222, 222c correspond to a request block 222, $222_{C(block)}$ that includes the target fingerprint 222, $222_T$. In these implementations, the distance identifier 330 may assume the target frame $F_T$ is a most recent frame $F_{recent}$ of the more than one target frame $F_T$. For example, when the target frame $F_T$ is the most recent media device frame $F_{Drecent}$, the most recent media device frame $F_{Drecent}$ closely corresponds to where the user 20 is within the media stream S at the media device 30 when media device frames $F_{D(1-n)}$ are captured.

FIGS. 3C-3D also illustrate the target identifier 340. When the distance identifier 330 determines each distance $D_T$ (e.g., distances $D_{T(1-5)}$) between each scene centroid 322 and the target fingerprint 222, $222_T$ of the corresponding target frame $F_T$, the target identifier 340 is configured to determine the target scene 302, $302_T$ of the target frame $F_T$ as being the respective scene 302 of the scene centroid 322 having the shortest distance $D_{T(min)}$ to the target fingerprint 222, $222_T$ of the target frame $F_T$. In other words, the target identifier 340 may identify the scene 302 with the shortest distance $D_{T(min)}$ to the target fingerprint 222, $222_T$ as the scene 302 containing the target frame $F_T$. In some examples, such as FIG. 3C, the scene frame matcher 300 simply determines the target scene 302, $302_T$ of the target frame $F_T$. Additionally or alternatively, the target identifier 340 may be configured to identify more than one target scene 302, $302_T$. For example, the target identifier 340 identifies "k" number of scenes with the shortest distance $D_{T(min)}$ to the target fingerprint 222, $222_T$. The number of scenes, "k," may be preprogrammed or may correspond to a target identifier threshold such that each distance $D_T$ that satisfies the target identifier threshold is identified by the target identifier 340.

FIG. 3D is an example where the target identifier 340 of the scene frame matcher 300 also identifies a frame F within the target scene 302, $302_T$ as being the target frame $F_T$. In this configuration, the target identifier 340 determines a correlation coefficient (e.g., a Pearson correlation, a Kendall correlation, or a Spearman correlation) between the fingerprint 222 of each frame F within the target scene 302, $302_T$ and the target fingerprint 222, $222_T$. FIG. 3D depicts an example where the target identifier 340 uses a Pearson correlation coefficient $P_{C(1-n)}$ as the correlation coefficient between each fingerprint 222 of the target scene 302, $302_T$ and the target fingerprint 222, $222_T$. Similar to the scene identifier 310, the target identifier 340 may use similarity levels or thresholds for the correlation coefficient. In some examples, such as FIG. 3D, when the target identifier 340 determines that the correlation coefficient (e.g., the Pearson correlation coefficient $P_C$) corresponding to a frame F within the target scene 302, $302_T$ satisfies a correlation threshold $T_C$, the target identifier 340 identifies the respective frame F of the target scene 302, $302_T$ as being the target frame $F_T$. Similar to the correlation threshold $T_C$ of the scene identifier 310, the correlation threshold $T_C$ of the target identifier 340 may determine whether a frame F within the target scene 302, $302_T$ is or is not the target frame $F_T$, depending on how the target identifier 340 is configured. As an example, FIG. 3D illustrates the target identifier 340 configured to identify a frame F of the target scene 302, $302_T$ is the target frame $F_T$ when the Pearson correlation coefficient $P_C$ satisfies the correlation threshold $T_C$. In some examples, after the target identifier 340 determines the correlation coefficient for each frame F within the target scene 302, $302_T$, the target identifier 340 selects a frame F with a maxima (e.g., a maximum correlation coefficient) of all correlation coefficients within the target scene 302, $302_T$ as being the target frame $F_T$.

FIG. 3E is an example to illustrate that the scene frame matcher 300 may interact or may perform functions at any of the layers (e.g., broadcast layer 100, network layer 120, or device layer 130) within the ACR environment 10. For example, FIG. 3E depicts the scene identifier 310 and the scene analyzer interacting with the broadcast media stream $S_B$ such that the scenes 302, $302_{(1-n)}$ are broadcast scenes 302, $302b_{(1-n)}$ with broadcast fingerprints 222, $222b_{(1-n)}$ and broadcast frames $F_{B(1-n)}$. In this example, the scene identifier 310 has already identified broadcast scenes 302, $302b_{(1-5)}$. Here, with the broadcast scenes 302, $302b_{(1-5)}$, the scene analyzer 320 determines broadcast scene centroids 322, $322b_{(1-5)}$. As depicted in FIG. 3E and mentioned above, the scene analyzer 320 is configured to store information (e.g., corresponding frame location, a frame time, or other related frame metadata) regarding a start of each broadcast scene 302, 302b, an end of each broadcast scene 302, 302b, or the centroid $C_{pt}$ of each broadcast scene 302, 302b. Each broadcast scene centroid 322, 322b represents a centroid $C_{pt}$ between an initial broadcast fingerprint 222, $222i_B$ of a corresponding initial broadcast frame $F_{iB}$ and a last broadcast fingerprint 222, $222l_B$ of a corresponding last broadcast frame $F_{LB}$. A difference between FIGS. 3C-3D and FIG. 3E is that the distance identifier 330 of FIG. 3E is configured to interact with the media device 30. In some examples, the distance identifier 330 is part of the device layer 130 (e.g., the ACR module 132) and communicating with other portions of the scene frame matcher 300. In other examples, the distance identifier 330 solely communicates (e.g., retrieves or receives) with the device layer 130 (e.g., the ACR module 132). FIG. 3E is an example where the target fingerprint 222, $222_T$ and the target frame $F_T$ of the distance identifier 330 is a target media device fingerprint 222, $222_{TMD}$ corresponding to a target media device frame $F_{DT}$. In some implementations, the distance identifier 330 receives more than one target media device frame $F_{DT}$ and is configured to select the most recent media device frame $F_{Drecent}$ as the target media device frame $F_{DT}$. Referring further to FIG. 3E, the distance identifier 330, determines the distance $D_{T(1-5)}$ between each broadcast scene centroid 322, $322b_{(1-5)}$ and the target media device fingerprint 222, $222_{TMD}$. Based on the distances $D_T$, the target identifier 340 determines the shortest distance $D_{T(min)}$ as the target broadcast scene 302, $302b_T$. Additionally, in some configurations, the target identifier 340 may receive broadcast fingerprints 222, $222b_{(1-n)}$ indicative of broadcast frames $F_{B(1-n)}$ corresponding to the target broadcast scene 302, $302b_T$ from the broadcast media stream $S_B$. In these configurations, for each broadcast frame $F_B$ of the target broadcast scene 302, $302b_T$, the target identifier 340 determines a Pearson correlation coefficient between the respective broadcast fingerprint 222, $222b$ and the target media device fingerprint 222, $222_{TMD}$ and determines whether the Pearson correlation coefficient satisfies the correlation threshold $T_C$. As FIG. 3E illustrates, when the Pearson correlation coefficient of a broadcast fingerprint 222, $222b$ satisfies the correlation threshold $T_C$, the target identifier 340 may identify the respective broadcast frame $F_B$ of the respective broadcast fingerprint 222, $222b$ as matching the target media device frame $F_{DT}$. In other words, the scene frame matcher 300 may accurately determine a frame matching a single captured media device frame $F_D$ and therefore may understand details (e.g., frame metadata) about the current frame position of the user 20 in the media stream S at the media device 30.

Figure 3F:
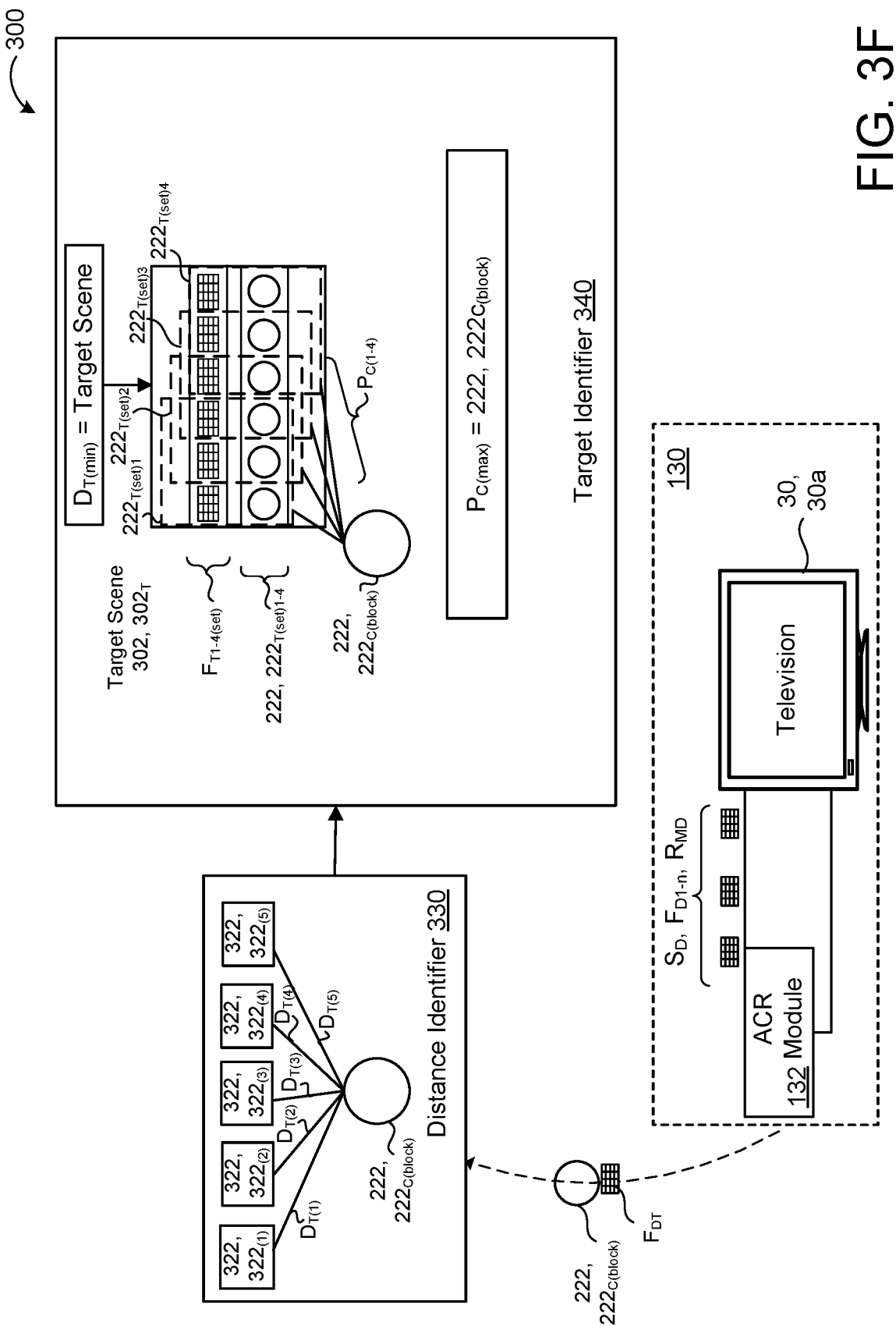

FIG. 3F is similar to FIG. 3E except FIG. 3F illustrates that, in some examples, for each target scene 302, $302_T$ identified by the target identifier 340, the target identifier 340 also identifies a sequential array of target scene frames $F_{T1-n}$ (e.g., broadcast frames $F_{1-n}$ related to a broadcast scene 302, $302b$). The sequential array of target scene frames $F_{T1-n}$ may include target scene frame locations to allow the target identifier 340 to select a set of target scene fingerprints 222, $222_{Tset}$ corresponding to a set of target scene frames $F_{T1-n(set)}$. In some implementations, the target identifier 340 selects the set of target scene fingerprints 222, $222_{Tset}$ to determine the correlation coefficient between the request block 222, $222_{C(block)}$ and the set of target scene fingerprints 222, $222_{Tset}$. The set of target scene fingerprints 222, $222_{Tset}$ may include a selected number of target scene fingerprints 222, $222_T$ sequentially adjacent (e.g., proceeding or subsequent to) to the target fingerprint 222, $222_T$. The number of target scene fingerprints 222, $222_T$ within the set of target scene fingerprints 222, $222_{Tset}$ may correspond to the media device fingerprints 222, $222c$ of the request block 222, $222c_{(block)}$ such that the target identifier 340 determines the correlation coefficient by comparing an equal number of target scene fingerprints 222, $222_T$ to an equal number of media device fingerprints 222, $222b$. The target identifier 340 may iteratively determine the correlation coefficient between a set of target scene fingerprints 222, $222_{Tset}$ and the request block 222, $222c_{(block)}$. For example, when the target identifier 340 iteratively determines the correlation coefficient for a set of target scene fingerprints 222, $222_{Tset}$, the target identifier 340 determines the correlation coefficient between each sequentially adjacent set of target scene fingerprints 222, $222_{Tset}$ within the target scene 302, $302_T$ and the request block 222, $222c_{(block)}$. An advantage of this iterative process is that the entire request block 222, $222c_{(block)}$ may be matched to fingerprints 222 and, therefore, frames $F_{1-n}$ of a scene 302.

Referring to FIG. 3F, the ACR module 132 may provide to the distance identifier 330 a request block 222, $222c_{(block)}$ of media device fingerprints 222, $222c$ including a target fingerprint 222, $222_T$ (e.g., a media device fingerprint 222, $222c$ corresponding to the most recent media device frame $F_{Drecent}$). Here, the target identifier 340 determines the target scene 302, $302_T$ corresponding to the request block 222, $222c_{(block)}$ according to the shortest distance $D_{T(min)}$ determined at the distance identifier 330. With the target scene 302, $302_T$, the target identifier 340 may select each set of target scene fingerprints 222, $222_{Tset}$. In this example for simplicity, the request block 222, $222c_{(block)}$ corresponds to three media device fingerprints 222, $222c_{(1-3)}$. Therefore, in this example, each set of target scene fingerprints 222, $222_{Tset}$ also has three target scene fingerprints 222, $222_{T(1-3)}$. When the target identifier 340 selects each set of target scene fingerprints 222, $222_{Tset}$, the target identifier 340 may determine a correlation coefficient (e.g., the Pearson correlation coefficient $P_C$) between each sequentially adjacent set of target scene fingerprints 222, $222_{Tset}$ within the target scene 302, $302_T$ and the request block 222, $222c_{(block)}$. For example, as shown in FIG. 3F, the target identifier 340 determines the following: a first Pearson correlation coefficient $P_{C1}$ between a first set of target scene fingerprints 222, $222_{Tset(1)}$ and the request block 222, $222c_{(block)}$; a second Pearson correlation coefficient $P_{C2}$ between a second set of target scene fingerprints 222, $222_{Tset(2)}$ and the request block 222, $222c_{(block)}$; a third Pearson correlation coefficient $P_{C3}$ between a third set of target scene fingerprints 222, $222_{Tset(3)}$ and the request block 222, $222c_{(block)}$; a fourth Pearson correlation coefficient $P_{C4}$ between a fourth set of target scene fingerprints 222, $222_{Tset(4)}$ and the request block 222, $222c_{(block)}$. In this example, the target identifier 340 compares each sequentially adjacent set of target scene fingerprints 222, $222_{Tset}$ with the request block 222, $222c_{(block)}$ such that the second set of target scene fingerprints 222, $222_{Tset(2)}$ corresponds to a single target scene fingerprint 222, $222_T$ shift from the first set of target scene fingerprints 222, $222_{Tset(1)}$. Here, the target identifier 340 selects the set of target scene fingerprints 222, $222_{Tset}$ with a maximum Pearson correlation coefficient $P_{C(max)}$ of all Pearson correlation coefficients $P_{C(1-4)}$ within the target scene 302, $302_T$ as matching the request block 222, $222c_{(block)}$. In some configurations where the target identifier 340 identifies more than one target scene 302, $302_{T(1-n)}$, the target identifier 340 compares each sequentially adjacent set of target scene fingerprints 222, $222_{Tset}$ with the request block 222, $222c_{(block)}$ for each of the more than one target scene 302, $302_{T(1-n)}$.

In some examples, the scene frame matcher 300 operates in timed intervals to reduce processing time or potential delays from processing. In other words, the scene frame matcher 300 may be configured to analyze a set amount of frames $F_{(1-n)}$ and/or fingerprints 222 from the media stream S at any one time. For example, the scene frame matcher 300 receives five minutes of fingerprints 222 from the fingerprinter 200. By using timed intervals, the scene analyzer 320 and the distance identifier 330 may have a controlled amount of scene centroids 322, $322_{(1-n)}$ to process. Additionally or alternatively, the scene frame matcher 300 dynamically operates according to timed intervals such that as the scene frame matcher 300 incorporates one frame F and/or one fingerprint 222, the scene frame matcher 300 removes one frame F and/or one fingerprint 222. This dynamic operation may occur on a first-in first-out basis such that the scene frame matcher 300 removes a least recent frame F and/or fingerprint 222 when the scene frame matcher 300 incorporates a most recent frame F and/or fingerprint 222.

Optionally, FIGS. 3C-3E may represent the scene frame matcher 300 such that the scene frame matcher 300 is without the scene identifier 310. Rather than dynamically identify each scene 302 according to the scene identifier 310, the scene frame matcher 300 may assume a scene 302 is a set amount of frames $F_{(1-n)}$. For example, each scene 302 corresponds to two seconds of frames $F_{(1-n)}$. With a set amount of frames $F_{(1-n)}$ for each scene 302, the scene frame matcher 300 may simply determine scene centroids 322 based on fingerprints 222 associated within the set amount of frames $F_{(1-n)}$. In other examples, the scene frame matcher 300 includes the scene identifier 310, but the scene identifier 310 is configured with a maximum number of frames $F_{(1-n)}$ per scene 302 such that when a scene change 312 does not occur within the maximum number of frames $F_{(1-n)}$, the scene identifier 310 automatically identifies the maximum number of frames $F_{(1-n)}$ as a scene 302.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 4:
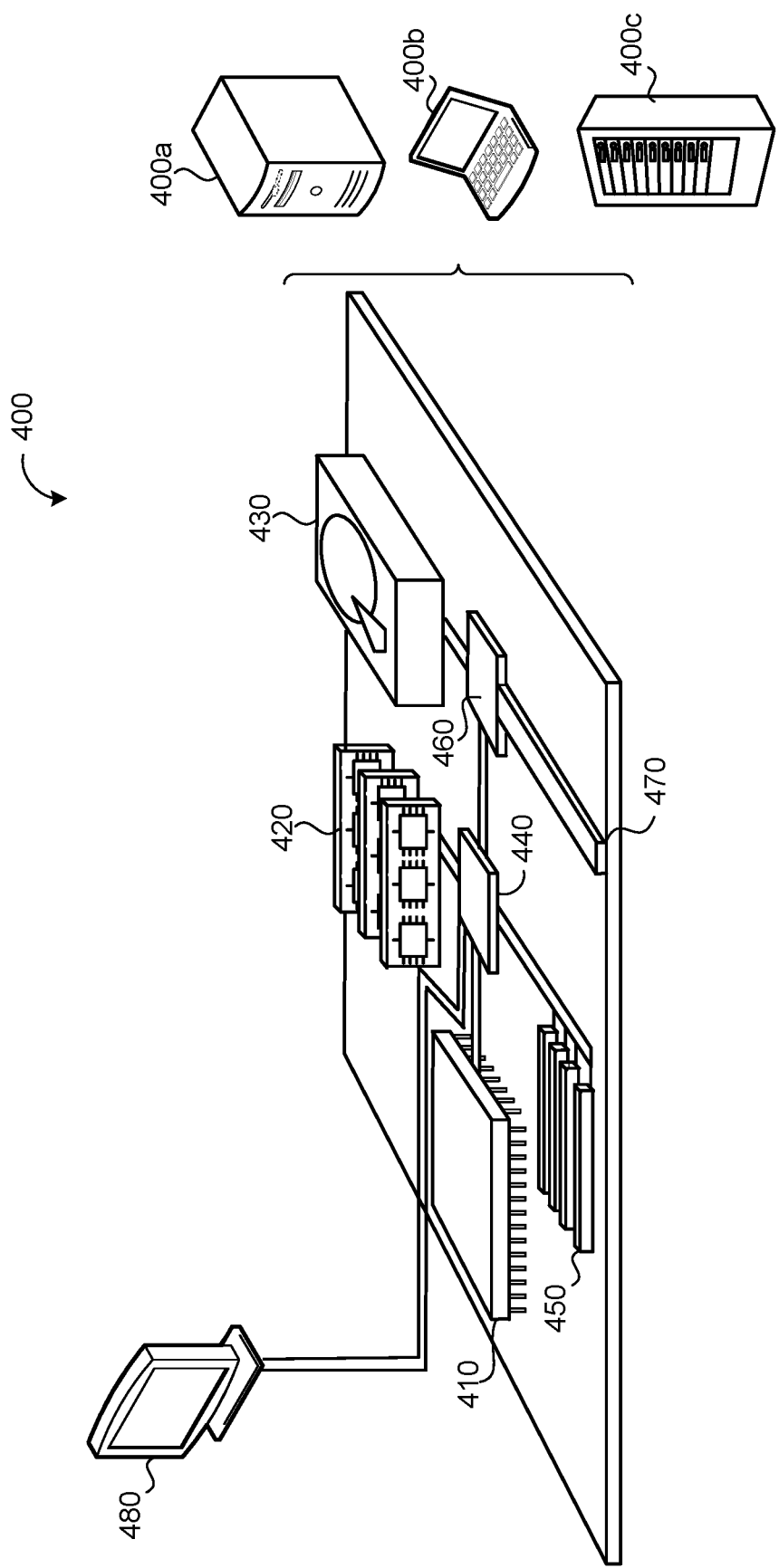
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, by a processor of a computing device, fingerprints indicative of frames of a media stream, wherein the media stream comprises a plurality of scenes, each scene comprising a plurality of frames ranging from an initial frame having a corresponding initial fingerprint to a last frame having a corresponding last fingerprint;
   obtaining, at the processor, scene centroids of corresponding scenes of the media stream, each scene centroid being a mean of fingerprints of the plurality of frames of a respective scene;
   for each of at least two scene centroids, determining, by the processor, a distance between the respective scene centroid and a target fingerprint of a corresponding single target frame of the media stream;
   selecting, by the processor, from the at least two scene centroids, a scene centroid having a shortest distance to the target fingerprint of the single target frame; and
   based on the selected scene centroid having the shortest distance to the target fingerprint of the single target frame, determining, by the processor, that the respective scene represented by the selected scene centroid is a target scene to which the single target frame belongs such that the single target frame is one of the plurality of frames that make up the respective scene.

2. The method of claim 1, wherein obtaining the scene centroids comprises:
   for each of at least two sequentially adjacent pairs of frames:
      determining, by the processor, a statistical correlation coefficient between the respective fingerprints;
      determining, by the processor, whether the statistical correlation coefficient satisfies a correlation threshold; and
      when the statistical correlation coefficient satisfies the correlation threshold, identifying, by the processor, a first scene as ending at a first frame of the pair of frames and a second scene as starting at a second frame of the pair of frames; and
   for each of at least two identified scenes, determining, by the processor, the respective scene centroid as the mean of fingerprints corresponding to the respective scene.

3. The method of claim 2, wherein the statistical correlation coefficient is a Pearson correlation coefficient.

4. The method of claim 2, wherein the statistical correlation coefficient is a Kendall correlation coefficient or a Spearman correlation coefficient.

5. The method of claim 1, further comprising:
   for a frame of the target scene:
      determining, by the processor, a statistical correlation coefficient between the respective fingerprint of the frame of the scene and the target fingerprint;
      determining, by the processor, whether the statistical correlation coefficient satisfies a correlation threshold; and
      when the statistical correlation coefficient satisfies the correlation threshold, identifying, by the processor, the frame of the scene as being the single target frame.

6. The method of claim 5, wherein the statistical correlation coefficient is a Pearson correlation coefficient.

7. The method of claim 5, wherein the statistical correlation coefficient is a Kendall correlation coefficient or a Spearman correlation coefficient.

8. The method of claim 1, wherein each fingerprint represents a 16 integer vector corresponding to average pixel values of sixteen sub-frames, the sixteen sub-frames defining a four by four array of the corresponding frame.

9. A system comprising:
a processor; and
memory hardware in communication with the processor, the memory hardware storing instructions that when executed on the processor cause performance of operations comprising:
receiving fingerprints indicative of frames of a media stream, wherein the media stream comprises a plurality of scenes, each scene comprising a plurality of frames ranging from an initial frame having a corresponding initial fingerprint to a last frame having a corresponding last fingerprint;
obtaining scene centroids of corresponding scenes of the media stream, each scene centroid being a mean of fingerprints of the plurality of frames of a respective scene;
for each of at least two scene centroids, determining a distance between the respective scene centroid and a target fingerprint of a corresponding single target frame of the media stream;
selecting, by the processor, from the at least two scene centroids, a scene centroid having a shortest distance to the target fingerprint of the single target frame; and
based on the selected scene centroid having the shortest distance to the target fingerprint of the single target frame, determining, by the processor, that the respective scene represented by the selected scene centroid is a target scene to which the single target frame belongs such that the single target frame is one of the plurality of frames that make up the respective scene.

10. The system of claim 9, wherein obtaining the scene centroids comprises:
for at least two sequentially adjacent pairs of frames:
determining a statistical correlation coefficient between the respective fingerprints;
determining whether the statistical correlation coefficient satisfies a correlation threshold; and
when the statistical correlation coefficient satisfies the correlation threshold, identifying a first scene as ending at a first frame of the pair of frames and a second scene as starting at a second frame of the pair of frames; and
for each of at least two identified scenes, determining the respective scene centroid as the mean of fingerprints of the respective scene.

11. The system of claim 10, wherein the statistical correlation coefficient is selected from the group consisting of a Pearson correlation coefficient, a Kendall correlation coefficient, and a Spearman correlation coefficient.

12. The system of claim 9, the operations further comprising:
for a frame of the target scene:
determining a statistical correlation coefficient between the respective fingerprint of the frame of the scene and the target fingerprint;
determining whether the statistical correlation coefficient satisfies a correlation threshold; and
when the statistical correlation coefficient satisfies the correlation threshold, identifying the frame of the scene as being the single target frame.

13. The system of claim 12, wherein the statistical correlation coefficient is selected from the group consisting of a Pearson correlation coefficient, a Kendall correlation coefficient, and a Spearman correlation coefficient.

14. The system of claim 9, wherein each fingerprint represents a 16 integer vector corresponding to average pixel values of sixteen sub-frames, the sixteen sub-frames defining a four by four array of the corresponding frame.

15. A non-transitory computer readable medium having stored thereon instructions that, upon execution by a processor, cause performance of a set of acts comprising:
receiving fingerprints indicative of frames of a media stream, wherein the media stream comprises a plurality of scenes, each scene comprising a plurality of frames ranging from an initial frame having a corresponding initial fingerprint to a last frame having a corresponding last fingerprint;
obtaining scene centroids of corresponding scenes of the media stream, each scene centroid being a mean of fingerprints of the plurality of frames of a respective scene;
for each of at least two scene centroids, determining a distance between the respective scene centroid and a target fingerprint of a corresponding single target frame of the media stream;
selecting, by the processor, from the at least two scene centroids, a scene centroid having a shortest distance to the target fingerprint of the single target frame; and
based on the selected scene centroid having the shortest distance to the target fingerprint of the single target frame, determining, by the processor, that the respective scene represented by the selected scene centroid is a target scene to which the single target frame belongs such that the single target frame is one of the plurality of frames that make up the respective scene.

16. The non-transitory computer readable medium of claim 15, wherein obtaining the scene centroids comprises:
for each of at least two sequentially adjacent pairs of frames:
determining a statistical correlation coefficient between the respective fingerprints;
determining whether the statistical correlation coefficient satisfies a correlation threshold; and
when the statistical correlation coefficient satisfies the correlation threshold, identifying a first scene as ending at a first frame of the pair of frames and a second scene as starting at a second frame of the pair of frames; and
for each of at least two identified scenes, determining the respective scene centroid as the mean of fingerprints corresponding to the respective scene.

17. The non-transitory computer readable medium of claim 16, wherein the statistical correlation coefficient is selected from the group consisting of a Pearson correlation coefficient, a Kendall correlation coefficient, and a Spearman correlation coefficient.

18. The non-transitory computer readable medium of claim 15, the set of acts further comprising:
for a frame of the target scene:
determining a statistical correlation coefficient between the respective fingerprint of the frame of the scene and the target fingerprint;
determining whether the statistical correlation coefficient satisfies a correlation threshold; and when the statistical correlation coefficient satisfies the correlation threshold, identifying the frame of the scene as being the single target frame.

19. The non-transitory computer readable medium of claim 18, wherein the statistical correlation coefficient is selected from the group consisting of a Pearson correlation coefficient, a Kendall correlation coefficient, and a Spearman correlation coefficient.

20. The non-transitory computer readable medium of claim 15, wherein each fingerprint represents a 16 integer vector corresponding to average pixel values of sixteen sub-frames, the sixteen sub-frames defining a four by four array of the corresponding frame.

\* \* \* \* \*